(12) United States Patent
Nakamichi et al.

(10) Patent No.: US 7,890,656 B2
(45) Date of Patent: Feb. 15, 2011

(54) TRANSMISSION SYSTEM, DELIVERY PATH CONTROLLER, LOAD INFORMATION COLLECTING DEVICE, AND DELIVERY PATH CONTROLLING METHOD

(75) Inventors: Koji Nakamichi, Kawasaki (JP); Akiko Yamada, Kawasaki (JP); Hitoshi Yamada, Kawasaki (JP); Akira Nagata, Kawasaki (JP); Katsuichi Nakamura, Tosu (JP); Seiji Nomiyama, Yokohama (JP); Mitsunori Fukazawa, Kawasaki (JP); Nobuhiro Kawamura, Kawasaki (JP); Sugiko Itagaki, Kawasaki (JP); Takashi Iawasaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1045 days.

(21) Appl. No.: 11/098,045

(22) Filed: Apr. 1, 2005

(65) Prior Publication Data
US 2005/0188073 A1      Aug. 25, 2005

Related U.S. Application Data

(63) Continuation of application No. PCT/JP03/01488, filed on Feb. 13, 2003.

(51) Int. Cl.
G06F 15/173       (2006.01)
(52) U.S. Cl. ....................... 709/241; 370/238
(58) Field of Classification Search ................ 709/241; 370/235
See application file for complete search history.

(56) References Cited

U.S. PATENT DOCUMENTS

| | | | | |
|---|---|---|---|---|
| 4,967,345 A * | 10/1990 | Clarke et al. | ................ | 709/241 |
| 5,526,414 A * | 6/1996 | Bedard et al. | .......... | 379/221.01 |
| 6,115,752 A * | 9/2000 | Chauhan | ..................... | 709/241 |
| 6,128,279 A * | 10/2000 | O'Neil et al. | ............... | 370/229 |
| 6,240,452 B1 * | 5/2001 | Welch et al. | ................ | 709/224 |
| 6,259,705 B1 * | 7/2001 | Takahashi et al. | ........... | 370/465 |
| 6,321,271 B1 * | 11/2001 | Kodialam et al. | ........... | 709/241 |
| 6,590,867 B1 * | 7/2003 | Ash et al. | .................... | 370/236 |

(Continued)

FOREIGN PATENT DOCUMENTS

EP       1 100 233       5/2001

(Continued)

OTHER PUBLICATIONS

International Search Report dated May 27, 2003.

(Continued)

Primary Examiner—Joseph Thomas
Assistant Examiner—Eric W Shepperd
(74) Attorney, Agent, or Firm—Katten Muchin Rosenman LLP

(57) ABSTRACT

A transmission system, having a plurality of delivery server side routers which communicate with a plurality of delivery servers for delivering a content; and a client side router which communicates with a client device for receiving the content, is configured to include: a database for storing server load states of the plurality of delivery servers, and respective individual link load states for a plurality of delivery paths between the plurality of delivery server side routers and the client side router; and a path control unit for determining a minimum load state delivery path having a minimum load state among the plurality of delivery paths, based on sums of the server load states and the respective individual link load states stored in the database.

12 Claims, 14 Drawing Sheets

U.S. PATENT DOCUMENTS

| | | | |
|---|---|---|---|
| 6,760,314 B1 * | 7/2004 | Iwata | 370/254 |
| 6,831,895 B1 * | 12/2004 | Ji et al. | 370/237 |
| 6,859,842 B1 * | 2/2005 | Nakamichi et al. | 709/238 |
| 7,079,493 B2 * | 7/2006 | Nakamichi et al. | 370/252 |
| 7,120,125 B2 * | 10/2006 | Kikuchi et al. | 370/252 |
| 7,185,104 B1 * | 2/2007 | Thorup et al. | 709/235 |
| 2001/0019554 A1 | 9/2001 | Nomura et al. | |
| 2001/0037401 A1 * | 11/2001 | Soumiya et al. | 709/232 |
| 2002/0012318 A1 * | 1/2002 | Moriya et al. | 370/225 |
| 2002/0051449 A1 | 5/2002 | Iwata | |
| 2002/0053029 A1 * | 5/2002 | Nakamura et al. | 713/201 |
| 2003/0055882 A1 * | 3/2003 | Kawamura | 709/203 |
| 2003/0149755 A1 * | 8/2003 | Sadot | 709/223 |
| 2004/0010617 A1 * | 1/2004 | Akahane et al. | 709/243 |

FOREIGN PATENT DOCUMENTS

| | | |
|---|---|---|
| JP | 2001-144804 | 5/2001 |
| JP | 2001-251343 | 9/2001 |
| JP | 2001-352342 | 12/2001 |
| JP | 2002-124976 | 4/2002 |
| JP | 2002-141943 | 5/2002 |
| JP | 2002-251383 | 9/2002 |
| JP | 2002-252639 | 9/2002 |
| JP | 2002-300185 | 10/2002 |
| JP | 2002-374290 | 12/2002 |

OTHER PUBLICATIONS

Notice of Reasons for Rejection dated Dec. 16, 2008, from the corresponding Japanese Application.

* cited by examiner

FIG. 11

| | | | | | | | |
|---|---|---|---|---|---|---|---|
| ROUTER 1 | LINK 1_1 | SELF IP ADDRESS | IP ADDRESS TO BE CONNECTED | WL | WR | WU | |
| | ... | | | | | | |
| | LINK 1_N | SELF IP ADDRESS | IP ADDRESS TO BE CONNECTED | WL | WR | WU | |
| | VIRTUAL LINK 1 | SELF IP ADDRESS | IP ADDRESS TO BE CONNECTED | Nc | Lcpu | M | |
| ... | | | | | | | |
| ROUTER K | LINK K_1 | SELF IP ADDRESS | IP ADDRESS TO BE CONNECTED | WL | WR | WU | |
| | LINK K_M | SELF IP ADDRESS | IP ADDRESS TO BE CONNECTED | WL | WR | WU | |
| | VIRTUAL LINK 1 | SELF IP ADDRESS | IP ADDRESS TO BE CONNECTED | Nc | Lcpu | M | |
| | VIRTUAL LINK 2 | SELF IP ADDRESS | IP ADDRESS TO BE CONNECTED | Nc | Lcpu | M | |
| VIRTUAL SERVER | VIRTUAL LINK 2 | | IP ADDRESS TO BE CONNECTED | Nc | Lcpu | M | |
| | ... | | | | | | |
| | VIRTUAL LINK S | SELF IP ADDRESS | IP ADDRESS TO BE CONNECTED | Nc | Lcpu | M | |

10a

TRANSMISSION SYSTEM, DELIVERY PATH CONTROLLER, LOAD INFORMATION COLLECTING DEVICE, AND DELIVERY PATH CONTROLLING METHOD

CROSS-REFERENCE TO RELATED APPLICATION

This application is a continuation of International Application PCT/JP03/01488 filed on Feb. 13, 2003, now pending, the contents of which are herein wholly incorporated by reference.

TECHNICAL FIELD

The present invention relates to a transmission system, a delivery path controller, a load information collecting device, and a delivery path controlling method, preferable for content delivery services through which contents such as moving image files are provided to users over, for example, IP (Internet Protocol) networks.

BACKGROUND ART

Since the Internet has widely been used by general users (individual, public, companies, government offices, or the like), many users have accessed the Internet over phone lines of slow connections. With the recent development of environment for access to the Internet, various high-speed broadband lines called broadband connections, such as ADSL (Asymmetric Digital Subscriber Line), CATV (Cable Television or Communication Antenna Television), or optical access, are getting available for users. As a result, the volume of packets transferred over networks (traffic or traffic volume) increases dramatically, comparing with traffic over networks using the conventional art.

One of the main causes of the traffic increase is that the importance of the Internet as an infrastructure has increased, so that companies, government offices or the like provide clients etc., with various service information such as entertainment, public services or the like.

Further, as the use of the Internet has been expanded, high quality networks are required. The criteria indicating the quality of a network is, for example, transmission delay and transmission band. Network operators are trying to reduce packet delay time and to ensure the contract band. Therefore, in many networks, a function of observing (monitoring) loads of the network itself is provided so as to try to avoid convergence, packet delay, packet disposition, and the like.

With such an increase in the traffic, loads placed on the networks become heavier, so that loads placed on delivery servers for delivering or supplying contents such as images to users over the networks also increase. The increase in the loads causes packet transmission delay, packet disposition and the like in the networks, and also causes overloads in delivery servers due to an increase in content delivery request messages for content data (transfer requests, transfer request packets, and transfer request messages, hereinafter referred to as "delivery requests" unless otherwise noted) provided to the delivery servers. Thereby, such a phenomenon as a deterioration in the quality of service (QoS) has been caused frequently. The quality of service indicates a comprehensive effect provided by various service performances which determine the satisfaction of the users receiving the services. Specifically, it is a technique for controlling communication quality (transmission delay, transmission band and the like).

Conventionally, the bottleneck in using the Internet was accessing parts between client devices (user terminals) and the Internet. However, since the access speed has been improved, the bottleneck lies in the inner parts (core) of networks or delivery servers for delivering contents, recently.

Accordingly, it is requested to provide means or mechanisms for balancing loads on the networks and the delivery servers. Two exemplary approaches to this request will be explained.

A first approach is to use a content delivery network (CDN). The CDN is a network used by providers such as telephone companies to perform delivering services of files such as Web contents to the users.

Note that a content may be digital data such as music, audio, a picture, a still image and a moving image, and a video, and contents may be editions of the digital data. However, all such data will be referred to as contents hereinafter, without distinguishing a content and contents, unless otherwise noted. Contents will be described on the premise that they mean Web contents, video delivery or music files, for example.

Further, as an example of a delivery service, a streaming delivery (stream delivery) is known.

A streaming delivery is a delivering system in which a server for delivering contents (hereinafter referred to as a delivery server) divides moving image file data into plural pieces, and delivers the divided pieces of file data to a user in plural times. The user playbacks each of the divided pieces of file data each time he/she receives it. With this system, the user does not need to wait for a moving image file data such as video to be downloaded completely, and even in a case of a line failure, moving images can be played back for pieces of the file data which have already been received.

Since a large volume of file data is transmitted/received in the streaming delivery, in the CDN, delivery servers are not located at specific places on the network but are located at places near client terminals so as to distribute the load.

FIG. 15 is a constitution diagram showing the CDN for the streaming delivery. An original server 130 shown in FIG. 15 retains a moving image file (original file). When the original server 130 receives a streaming delivery request from, for example, a client device 80a among client devices 80a-80c, the original server 130 temporarily transfers the moving image file to a cache server 81a provided near the client device 80a, and then the cache server 81a delivers in a stream the moving image file to the client device 80a. Next, when the original server 130 or the cache server 81a receives a streaming delivery request of the same content from the client device 80a, the moving image file is directly delivered from the cache server 81a to the client device 80a. Further, the original server 130 may transfer the content in advance to all cache servers 81a-81c in the CDN 140.

With this system, the load concentration on the original server 130 can be avoided, and deterioration in the quality due to packet transfer delay can be avoided as well.

Here, respective delivery paths for content delivery and streaming delivery are calculated considering the costs (load states). The costs usually include a link cost indicating the load state between adjacent two routers (adjacent routers) among a plurality of routers in the network, and a network cost indicating the load state of a part or the whole of the network. In the following description, a load state means a load and volume showing the load, unless otherwise noted.

The adjacent routers are connected to each other via a transmission path, to which a prescribed transmission band (pass band) is set. With such transmission path and transmission band, a link is established. Since the load state of the link is determined based on the allowable transmission volume and the actual packet transmission volume, an individual load state of each link is observed as a link cost. Respective link costs are added, and observed as the network cost.

Further, a delivery path is calculated by using Dijkstra algorithm. Dijkstra algorithm is for calculating the cost between two desired routers in the network, and searching for a delivery path having a minimum cost value among the costs obtained by adding respective costs calculated, based on the cost between a desired router and an adjacent router thereto in the CDN 140, and on the cost between the desired router and a router not adjacent thereto.

In an example of this cost, the inverse number of the link utilization (band utilization) or the inverse number of the link free band is used as a parameter. When using such an inverse number, the link free band between adjacent routers becomes larger as the cost is reduced. Therefore, the minimum cost delivery path obtained by the Dijkstra calculation shows a delivery path having the largest free band in the CDN 140. A calculation method using the link utilization is proposed by the inventors of the present invention. A path (delivery path) selecting method of a communication network described in a patent document 1 described below is a method in which traffic received at an input side node is equally sorted into a plurality of paths in units of communication elements to be transferred. Thereby, it is possible to balance the load on each link, and also to prevent the sequence of packets transmitted from the same client device from being reversed at the output side node.

Next, a second approach to the load balancing is that a plurality of delivery servers within a network share processing of a transfer request from a client device so as to reduce the load placed on one delivery server (global delivery server load balancing system).

FIG. 16 is a diagram for explaining the global delivery server load balancing system. Both delivery servers 150a, 150b shown in FIG. 16 retain the same contents. Here, if the delivery servers 150a, 150b are provided apart from client devices 80d, 80e, a router 90a communicating with the client devices 80d, 80e is so configured to receive load information of each of the delivery servers 150a, 150b via routers 90b, 90c from the delivery servers 150a, 150b themselves in advance or upon reception of a transfer request from the client device 80d, 80e, and distribute the transfer request to either the delivery server 150a or the delivery server 150b with the lower load.

The global delivery server load balancing system is performed associating with DNS (Domain Name System) which is a system for converting host names of the delivery servers 150a, 150b to actual IP addresses (hereinafter abbreviated as address, unless otherwise noted). In the global delivery server load balancing system, typical delivery paths according to a routing table determined by the router is used as the delivery paths in the network.

Patent Document 1: Japanese Patent Application Laid-Open No. 2001-144804.

However, the CDN 140 (see FIG. 15), for example, is subject to quality deterioration when delivery requests from the client devices 80a-80c concentrate on temporarily popular contents such as movies. In the CDN 140 for load balancing, when delivery requests concentrate on the cache server 81a whereby a high load is placed thereon, there is caused a problem that the streaming quality of a cache server near the client device 80a deteriorates.

Further, in the global delivery server load balancing system for load balancing, delivery paths are set without considering the costs and delay time of the network. Accordingly, when the load placed on the network increases, the content quality to be delivered may be deteriorated although the loads on the delivery servers 150a, 150b are not high, and there is a problem that this probability cannot be eliminated.

DISCLOSURE OF THE INVENTION

The present invention has been developed in view of these problems. An object of the present invention is to provide a transmission system, a delivery path controller, a load information collecting device and a delivery path controlling method, capable of preventing an increase in the load placed on delivery servers and an increase in the loads placed on a plurality of routers in the network and the network as a whole, and obtaining delivery paths appropriate for content delivery, in a transmission system for streaming delivery, for example.

In order to achieve this object, a transmission system of the present invention having, a plurality of delivery server side routers which communicate with a plurality of delivery servers for delivering a content, and a client side router which communicates with a client device for receiving the content, the system comprises: a database for storing server load states of the plurality of delivery servers, and respective individual link load states for a plurality of delivery paths defined between the plurality of delivery server side routers and the client side router; and a path control unit for determining the minimum load state delivery path having the minimum load state among the plurality of delivery paths, based on the sums of the server load states and the respective individual link load states stored in the database.

With this configuration, both of the loads placed on the network and on the delivery servers can be balanced, so that the loads on the network and the servers can be reduced.

Further, the transmission system may comprise a load information collecting unit capable of collecting at least either the server load states of the delivery servers or the respective individual link load states, and updating the database with the server load states or the respective individual link load states collected. Moreover, each of a plurality of routers, provided in the minimum load state delivery path determined by the path control unit, may have a router control unit for setting a connection to deliver the content. With this configuration, a set of the minimum delivery path and delivery server is selected, whereby both of the load increase in the delivery servers and load increase in the network can be avoided.

Further, the transmission system of the present invention includes a network having a plurality of delivery servers for delivering a content responding to a delivery request from a client device receiving the content, and comprises: a database for storing server load states of the plurality of delivery servers, and respective individual link load states for a plurality of delivery paths defined between the plurality of delivery server side routers and the client side router; a first collecting unit capable of collecting the server load states of the delivery servers and updating the database; a second collecting unit capable of collecting the respective individual link load states and updating the database; a path control unit for determining the minimum load state delivery path having the minimum load state among the plurality of delivery paths, based on the sums of the server load states and the respective individual link load states stored in the database; and a router control unit, for setting a connection to deliver the content, included in each of a plurality of routers provided in the minimum load state delivery path determined by the path control unit.

With this configuration, both of the load increase in the delivery servers and the cache servers and load increase in the network can be avoided, the optimum set of a delivery path and a delivery server may be selected, so that a content delivery network of high reliability can be realized.

Further, a delivery path controller of the present invention in a transmission system having, a plurality of delivery server side routers which communicate with a plurality of delivery servers for delivering a content; and a client side router which communicates with a client device for receiving the content, comprises: a database for storing server load states of the plurality of delivery servers, and respective individual link load states for a plurality of delivery paths defined between the plurality of delivery server side routers and the client side router; a path control unit for determining the minimum load state delivery path having the minimum load state among the plurality of delivery paths, based on the sums of the server load states and the respective individual link load states stored in the database; and a router control unit, for setting a connection to deliver the content, included in each of a plurality of routers provided in the minimum load state delivery path determined by the path control unit.

With this configuration, load information for each of the network, routers and delivery servers can be monitored regularly, whereby a delivery path can be selected appropriately corresponding to load changes.

Further, for an individual link load state between adjacent routers among a plurality of routers through which a packet is transferred, the database may store bidirectional individual link load states in a first direction from one router to the other router and a second direction from the other router to the one router, and by using at least either of the bidirectional individual link load states, the path control unit may determine a set of a delivery server and a delivery path having such a load state that the sum of the individual link load states and the server load state is minimum, as the minimum load state delivery path. Further, the path control unit may determine the set of a delivery server and a delivery path by using individual link load states in directions from the plurality of delivery server side routers to the client side router or in directions from the client side router to the plurality of delivery server side routers for the plurality of delivery paths, respectively.

With this configuration, both of the load increase in the servers and load increase in the network can be avoided.

The path control unit may determine the set of a delivery server and a delivery path by using individual link load states in directions from a virtual node accessing to the plurality of delivery servers via virtual links, respectively, to the client side router. Further, as a responding path from a delivery server, received a transfer request from the client side router, to the client side router, the path control unit may determine a set of a delivery server which is a delivery request transfer destination and a delivery path, by using individual link load states in directions from the client side router to the plurality of delivery server routers. With this configuration, the load states of the delivery servers are replaced by the virtual links, whereby there is no need to add load states of the delivery servers additionally, so that calculation processing of the delivery path can be made to be efficient and performed at a high speed.

In addition, as a responding path from a delivery server, received a transfer request from the client side router, to the client side router, the path control unit may determine a set of a delivery server which is a delivery request transferring destination and a delivery path, by using a virtual node accessing to the plurality of delivery servers via virtual links respectively to the client side router, as well as the individual link load states in directions from the client side router to the plurality of delivery server routers. Further, the path control unit may determine the minimum load state delivery path by using load states weighted for the respective individual link load states and the load states of the plurality of delivery servers, respectively.

With this configuration, it is possible to calculate the load state as a whole by weighting an influence of the load on the network or an influence of the load on the delivery servers, so that the cost calculation method may be adjusted based on, for example, the intention of the system operator. This improves the service quality. Moreover, information about the virtual link is managed in one database, so that it is possible to determine the delivery path effectively.

Further, the path control unit may be configured to determine the minimum load state delivery path based on the following (Q1) to (Q4) as a load state of a server:

(Q1) Load information on plural processors,
(Q2) Memory used amount of delivery server,
(Q3) disk used amount of delivery server, and
(Q4) value derived from the ratio of the number of packets or transfer bytes outputted per unit hour from delivery server, to the maximum number of packets or transfer bytes capable to be outputted per unit hour from the delivery server.

Further, a load information collecting device of the present invention comprises: a database for storing server load states of the plurality of delivery servers, and respective individual link load states for a plurality of delivery paths defined between the plurality of delivery server side routers and the client side router; and a path control unit for writing, into the database, the server load states collected from the delivery servers and individual link load states between adjacent routers collected from the adjacent routers among the plurality of routers.

With this configuration, both of the load increase in the delivery servers and load increase in the network can be avoided, and a delivery path can be selected appropriately, which enables a stable content delivery.

Further, a method for determining a delivery path of the present invention comprises the steps of: collecting server load states of the plurality of delivery servers; collecting individual link load states between adjacent routers collected from the adjacent routers among the plurality of routers; calculating sums of the server load states and the individual link load states collected, by using a Dijkstra calculation; based on the sums, determining the minimum load state delivery path having the minimum load state among the plurality of delivery paths; and setting a connection for delivering the content in each of a plurality of routers provided in the minimum load state delivery path determined.

With this configuration, each delivery path can be calculated through, for example, one Dijkstra calculation, which improves the calculation efficiency.

BRIEF DESCRIPTION OF THE DRAWINGS

FIG. 11 is a chart for explaining the data configuration of the database according to the first embodiment of the present invention.

BEST MODE FOR CARRYING OUT THE INVENTION (A) Explanation of a First Embodiment of the Present Invention FIG. 1 is a configuration diagram showing a streaming delivery system (transmission system) according to a first embodiment of the present invention. The streaming delivery system 100 shown in FIG. 1 is for controlling delivery paths while considering costs (load states) of the servers and the links between routers of the network. This system includes: a CDN (Content Delivery Network) 140; six routers 1-6 for example, for transferring packets, provided on the CDN 140; three delivery server side routers 3, 4 and 6 communicating with three delivery servers 1a-3a for example, for delivering contents, among the six routers 1-6; a client side router 1 (router 1) communicating with a client device (client terminal or client) 30 receiving contents, among the six routers 1-6; and a controller (delivery path controller) 40 connected to the routers 1-6, the delivery servers 1a-3a and the client device 30.

(1) Schematic Configuration of the Streaming Delivery System 100

(1-1) CDN 140

The CDN 140 is a network including, for example, three delivery servers 1a-3a for delivering contents responding to delivery requests from the client device 30. Specifically, it is an IP network providing a streaming delivery service. In the CDN 140, workstations, personal computers, routers, LAN (Local Area Network) and the like are connected.

Each of the delivery servers 1a-3a retains the same contents such as videos. The client device 30 transmits a content delivery request to the selected one of the delivery servers 1a-3a and determined by a delivery path controlling method of the present invention described later. Upon receipt of the delivery request, any one of the delivery servers 1a-3a divides the requested content into plural pieces of file data, and the divided pieces of file data are made into packets (made into IP packets) which are transmitted to the client device 30. The plurality of packets pass through an appropriate delivery path within the CDN 140 so as to be transferred to the client device 30, and the client device 30 plays back the content by the plural pieces of file data.

Thereby, the user does not need to wait for the moving image file such as video to be downloaded completely, and even when a line failure occurs, the moving image can be played back for the pieces of file data which have been already received.

Instead of the CDN 140, a network over which MAC (Media Access Control) packets (layer 2 packets), for example, can be transmitted may be used, and SONET (Synchronous Optical Network) may also be used.

(1-2) Relationship between Delivery Path and Individual Link Costs

Figure 1:
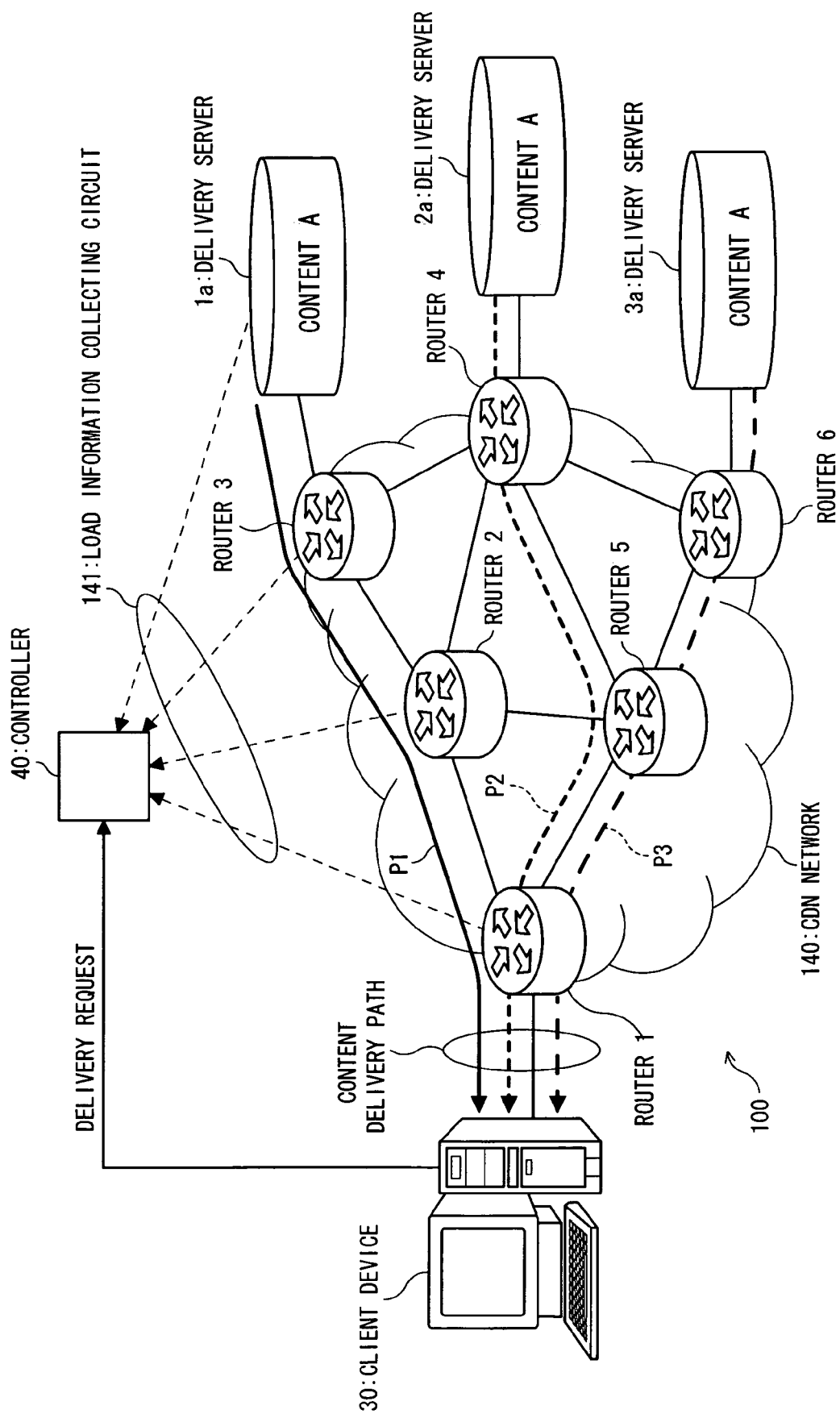
FIG. 1 is a configuration diagram showing a streaming delivery system (transmission system) according to a first embodiment of the present invention.

A delivery path is a path through which contents are delivered. It means a packet passing path from a delivery server side router 3, 4 or 6, connected to each delivery servers 1a-3a respectively, to the client side router 1 connected to the client device 30. In FIG. 1, three delivery paths correspond to a first delivery path (router 1, router 2, router 3), a second delivery path (router 1, router 5, router 4), and a third delivery path (router 1, router 5, router 6).

The cost of the first delivery path is calculated by summing an individual link cost 1-2 between the routers 1 and 2, and an individual link cost 2-3 between the routers 2 and 3. The cost of the second delivery path is calculated by summing an individual link cost between the routers 1 and 5, and an individual link cost between the routers 5 and 4. This calculation also applies to the third delivery path.

Accordingly, each of the three delivery paths between the three delivery server side routers 3, 4 and 6 and the client side router 1 is indicated by the sum of individual link costs between three routers of the delivery path.

Further, the individual link cost between the adjacent routers 1 and 2 is indicated by taking into account a direction between the adjacent routers 1 and 2. That is, bidirectional individual link costs including a direction from one router 1 to the other router 2 and a direction from the other router 2 to the one router 1 are used. Both of the bidirectional individual link costs are observed (monitored) by the controller 40. Here, the adjacent routers 1 and 2 indicate a pair of routers 1 and 2 among the six routers 1-6 for transferring packets. Routers 1 and 5, routers 2 and 3, routers 2 and 4, and routers 2 and 5 are also in the adjacent relationship, respectively. Hereinafter, adjacent routers means routers connected to each other over a physical line (individual link), unless otherwise noted.

In order to optimize a content delivery path, as for the content delivery direction, a direction from the delivery servers 1a-3a to the client device 30 is explained in the first embodiment, and a direction from the client device 30 to the delivery servers 1a-3a is explained in a second embodiment described later.

(1-3) Client Device 30

Figure 2:
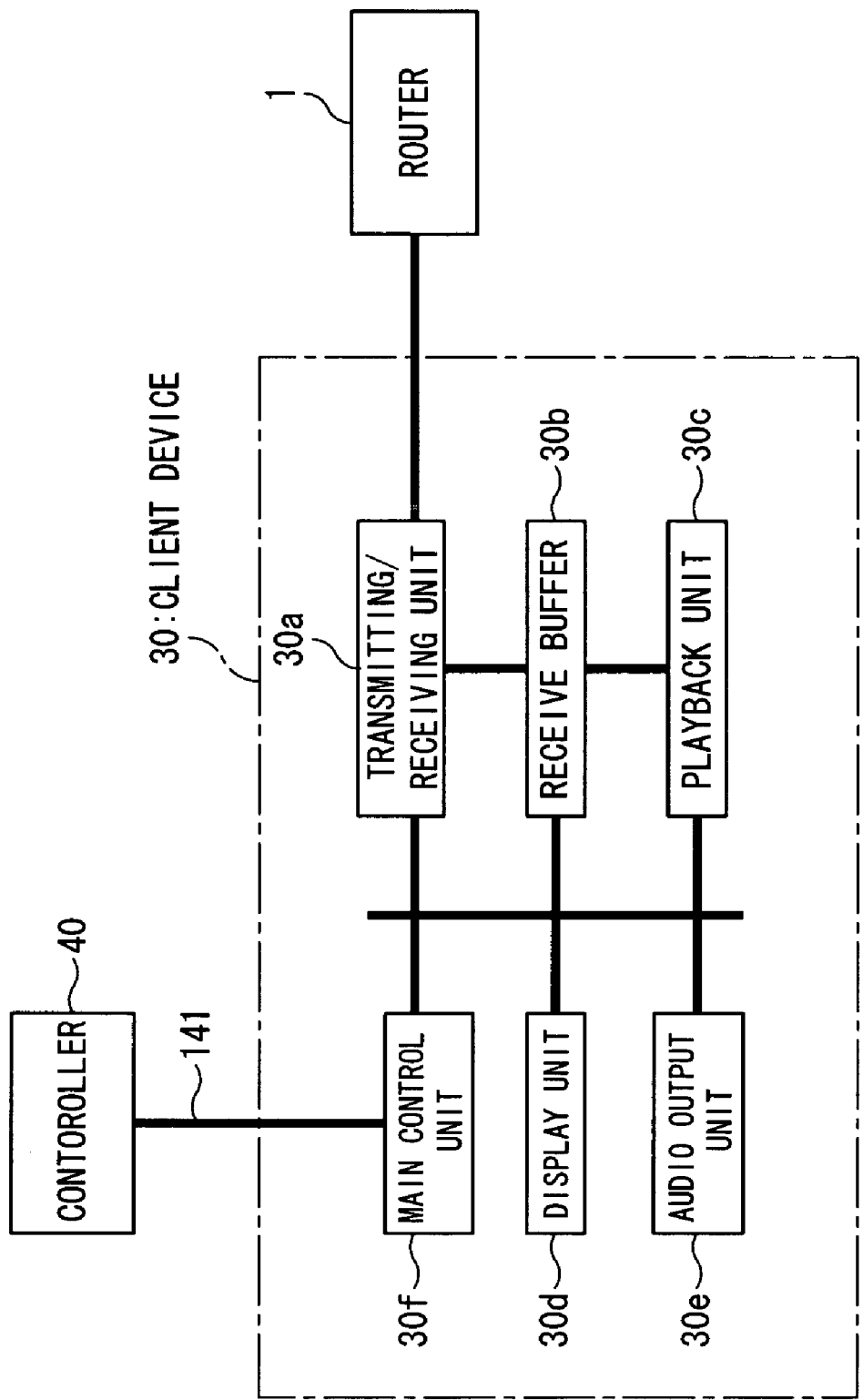
FIG. 2 is a block diagram showing a client device according to the first embodiment of the present invention.

The client device 30 is a terminal such as a personal computer used by a user. As shown in FIG. 2 for example, the client device 30 is configured to include: a transmitting/receiving unit 30a for transmitting and receiving packets; a receive buffer 30b for accumulating packets received by the transmitting/receiving unit 30a; a playback unit 30c for assembling file data included in the packets accumulated in the receive buffer 30b and outputting moving image data and audio data; a display 30d for displaying the moving image data from the playback unit 30c; an audio output unit 30e for amplifying and outputting the audio data from the playback unit 30c; and a main control unit 30f for controlling each unit of the client device 30. Here, an interface between the client device 30 and the router 1 is preferably an interface through which packets of broadband data can be transmitted, and desired protocols can be used. Further, the client device 30 and the controller 40 are connected over a subscriber line such as a telephone, LAN, or the like. The client device 30 and the controller 40 may be connected over a load information collecting line 141 for informing the controller 40 of the load states of the routers 1-6 and the delivery servers 1a-3a, or may be connected over various lines or networks.

The client device 30 transmits a delivery request to the client side router 1 through an operation by the user, and the delivery request reaches any one of the delivery servers 1a-3a from the client side router 1 over the appropriate delivery path determined by the controller 40. Any one of the delivery servers 1a-3a delivers the content to the client device 30 in accordance with the delivery request, and the user plays back the desired images and audio.

(1-4) Delivery Servers 1a-3a

Each of the delivery servers 1a-3a shown in FIG. 1 is for delivering contents such as stream contents, and stores the same contents A. The same contents A have been transferred beforehand from the original server (not shown) provided inside or outside the CDN 140. The contents A which have been accumulated in the original server are cached to the plural delivery servers 1a-3a, whereby the load on the original server for delivering the contents A corresponding to a number of delivery requests from users are deconcentrated so as to avoid concentration of the load on the original server.

The delivery servers 1a-3a may be workstations or personal computers, each of which includes a CPU (Central Processing Unit), a RAM (Random Access Memory, hereinafter abbreviated as a memory), a readable/writable recording medium such as a hard disk, and the like.

Figure 14:
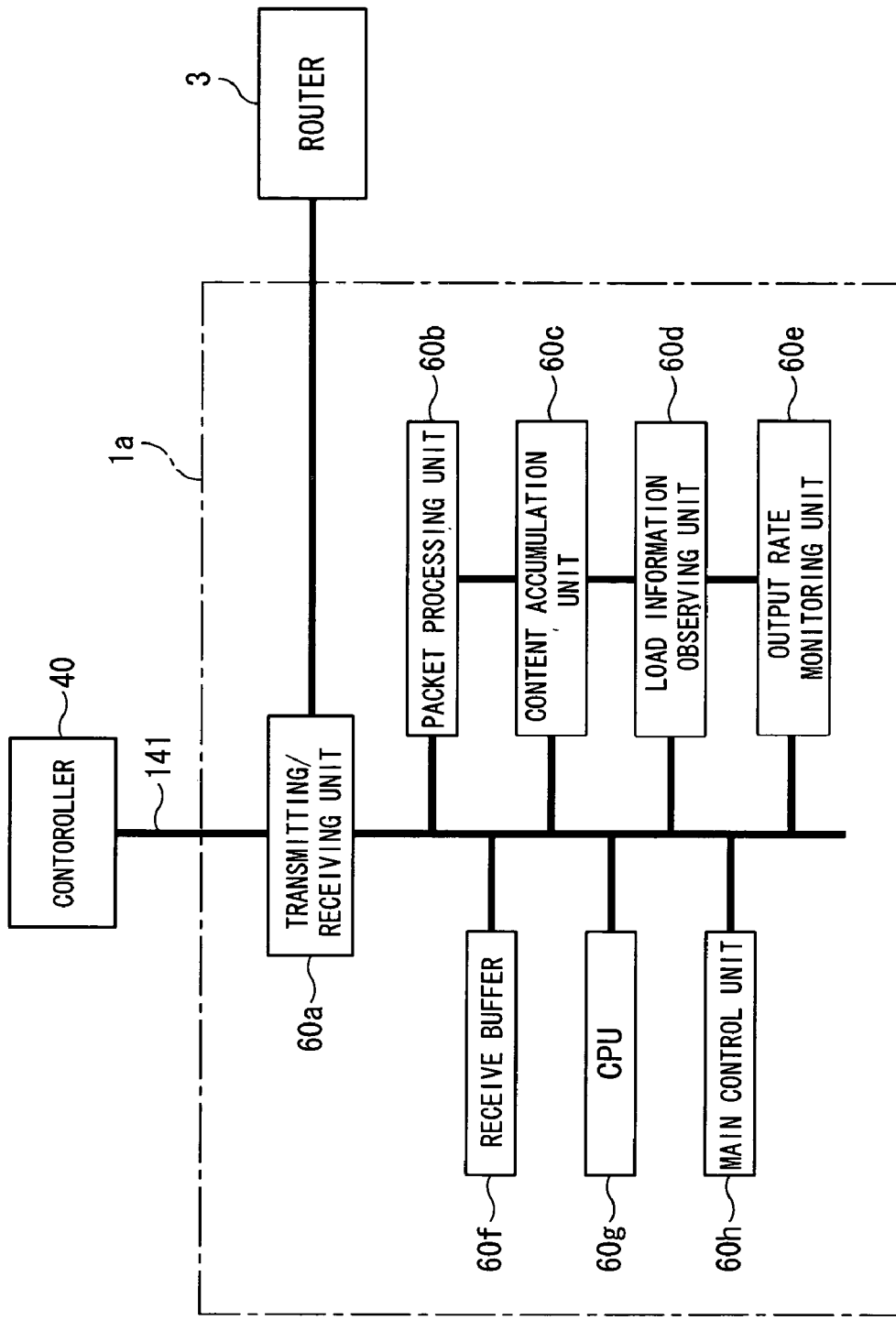
FIG. 14 is a schematic block diagram showing a delivery server according to the first embodiment of the present invention.
Figure 15:
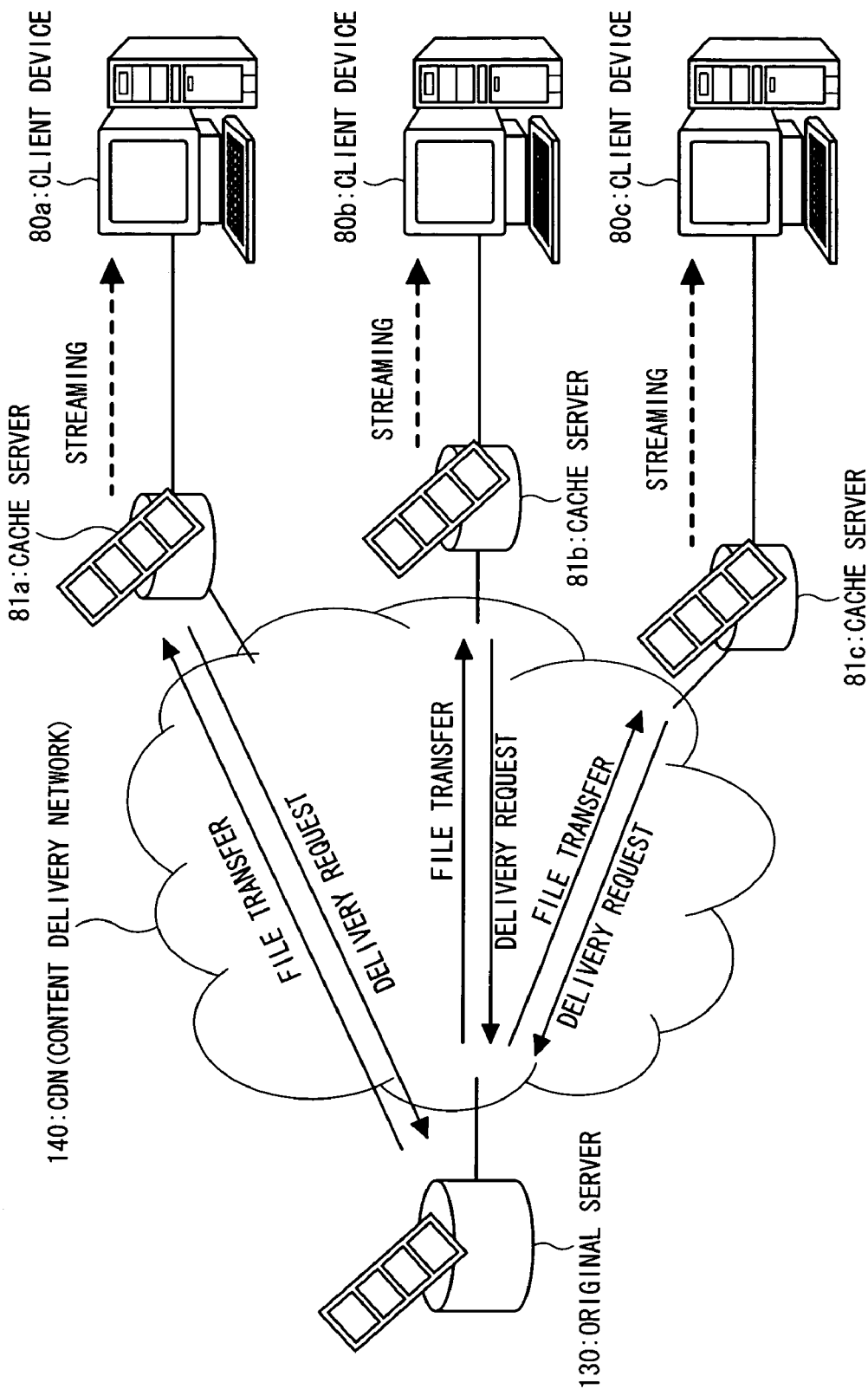
FIG. 15 is a configuration diagram showing a CDN for streaming delivery.
Figure 16:
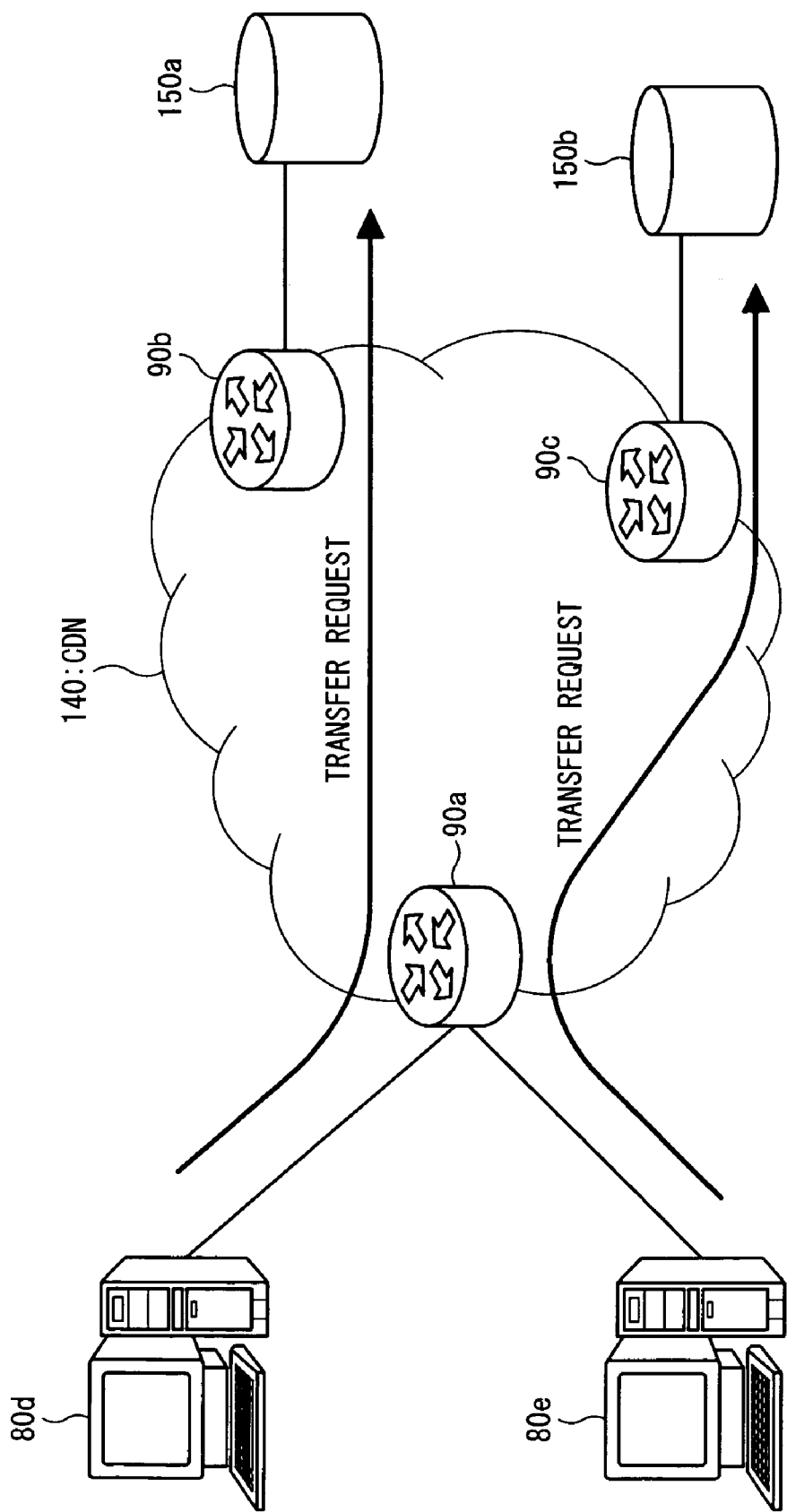
FIG. 16 is a diagram for explaining a global delivery server load balancing system.

FIG. 14 is a schematic block diagram of a delivery server 1a according to the first embodiment of the present invention, showing an example of the configuration. The delivery server 1a shown in FIG. 14 is configured to include a transmitting/receiving unit 60a, a packet processing unit 60b, a content accumulation unit 60c, a load information observing unit (load state information observing unit or load state observing unit) 60d, an output rate monitoring unit 60e, a receive buffer 60f, a CPU 60g, a main control unit 60h, and the like (hereinafter, each of which is referred to as a function unit).

Here, the transmitting/receiving unit 60a is connected to the router 3, the controller 40 and the like, and transmits and receives packets. The packet processing unit 60b discomposes received packets, and generates transmitting packets, for example. The receive buffer 60f is a memory for temporarily retaining various kinds of data. The output rate monitoring unit 60e monitors the number of routers 1-6 connected. The content accumulation unit 60c is a recording medium such as a hard disk for accumulating contents such as the contents A having been transferred from a cache server (not shown) beforehand. The main control unit 60h controls respective function units within the delivery server 1a.

The load information observing unit 60d is capable of observing information on various loads (hereinafter referred simply as load information) such as the load state of the CPU 60g (CPU occupied rate) for performing arithmetic processing, the memory utilization of the receive buffer 60f (RAM used area), and the hard disk utilization (disk utilization) of the content accumulation unit 60c, respectively. The load information observing unit 60d is realized by, for example, application software installed in the delivery server 1a, and the load information can be transmitted to the controller 40.

Note that the delivery servers 2a and 3a also have the same configuration as that of the delivery server 1a, so the overlapping explanation is omitted. Further, the configuration of each function unit may be modified in various ways.

(1-5) Routers 1-6

Each of the routers 1-6 is for transferring packets. Further, the router 1, the routers 2 and 5, and the routers 3, 4 and 6 function as the client side router 1, a relaying routers, and the delivery server side routers 3, 4 and 6, respectively.

Figure 3:
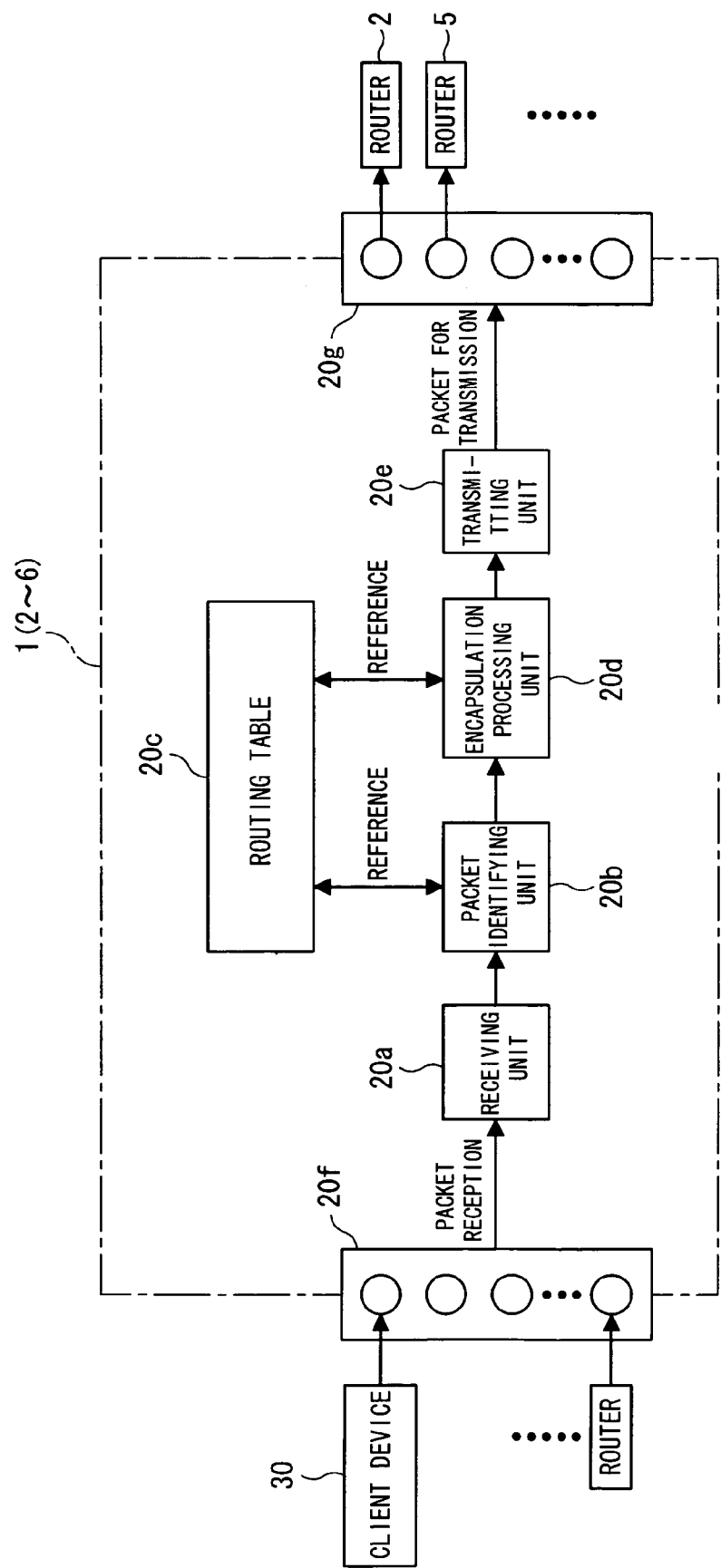
FIG. 3 is a schematic block diagram showing a router according to the first embodiment of the present invention.

FIG. 3 is a schematic block diagram of the routers 1-6 according to the first embodiment of the present invention, showing the main part of a transfer processing unit in one of a number of transfer directions. The router 1 shown in FIG. 3 is configured to include a receiving unit 20a, a packet identifying unit 20b, a routing table 20c, an encapsulation processing unit 20d, a transmitting unit 20e, input ports 20f, and output ports 20g. In FIG. 3, the same reference numerals indicate the same elements as described above.

Here, the receiving unit 20a receives a packet inputted from the client device 30 via an input port 20f. Further, the packet identifying unit 20b decapsulates or terminates the packet received by the receiving unit 20a, and judges (or identifies) whether the address of the destination is the router 1 itself or a router other than the router 1, by referring to the routing table 20c. If the received packet is destined for the router 1 based on the judgment result, the packet identifying unit 20b extracts the information data of the packet.

Further, the routing table 20c retains routing information in which addresses of received packets and the output ports 20g are related. When the packet with an address different from that of the router 1 is received in the packet identifying unit 20b, the encapsulation processing unit 20d outputs (hops) the packet to the next router as it is, and outputs new data to be transmitted, which is made into a packet and given a desired header. Then, the transmitting unit 20e transfers the packet outputted from the encapsulating processing unit 20d to output ports 20g corresponding to the respective adjacent routers 2 and 5 connected to the router 1.

Thereby, the IP address (Destination Address) of the packet inputted from the client device 30 is extracted by the packet identifying unit 20b, and a suitable output port 20g is selected for the extracted destination address based on packet transfer paths retained in the routing table 20c, then the destination address is outputted.

It is preferable that the routing table 20c performs routing processing a number of times so as to retain the relationship based on the number of processing times between the address and the output port 20g. That is, such an address learning function improves the transfer efficiency.

Processing by the router 1 in the reverse transfer direction is same as that of the aforementioned transfer direction. Further, each of the routers 2-6 also has the same configuration as that of the router 1, and therefore the overlapping explanation is omitted.

(1-6) Controller 40

The controller 40 (see FIG. 1) is connected to the client device 30, the routers 1-6, and the delivery servers 1a-3a, respectively, and informs the routers and the respective delivery servers 1a-3a of the optimum content delivery path.

Figure 4:
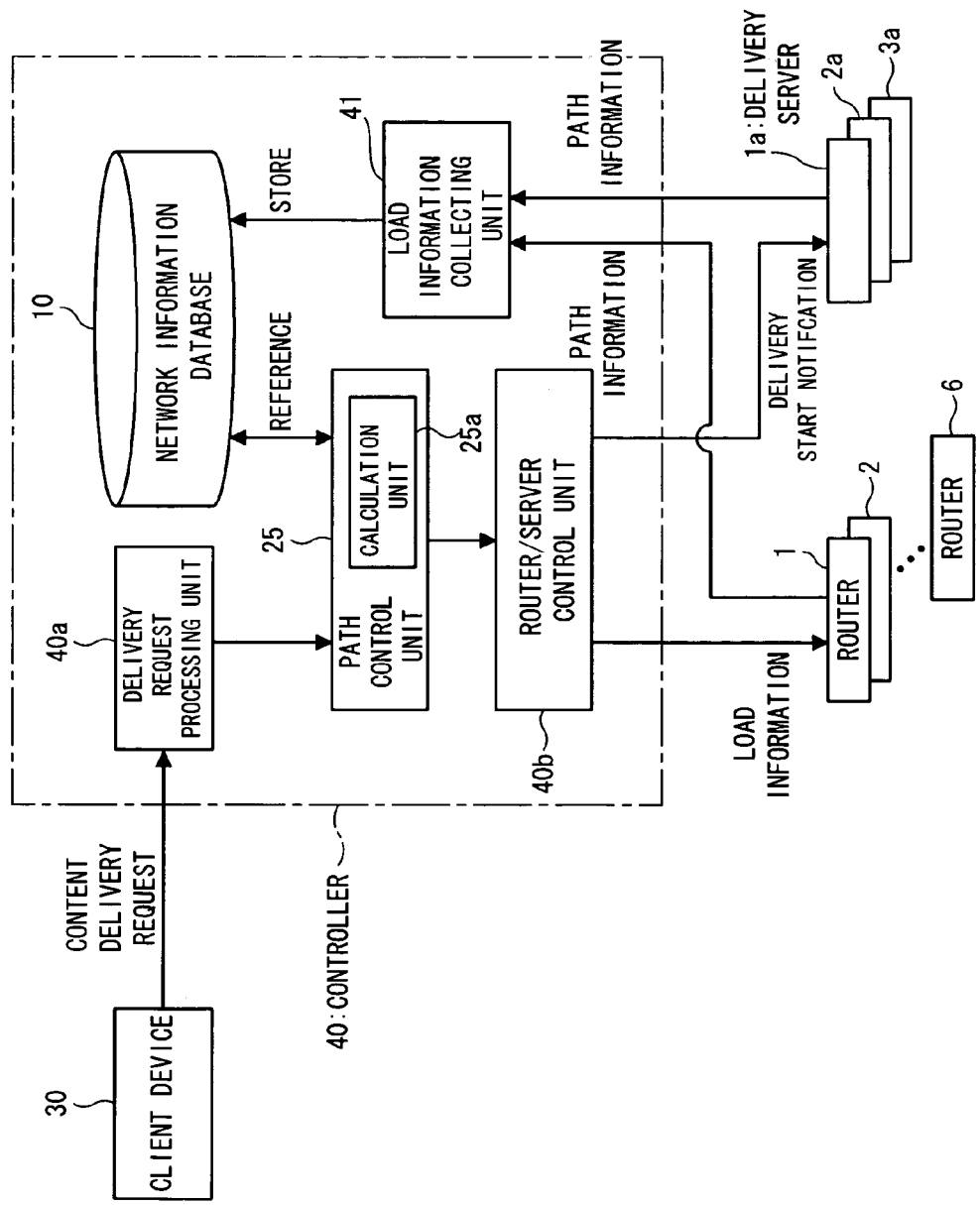
FIG. 4 is a block diagram showing a controller according to the first embodiment of the present invention.

FIG. 4 is a block diagram of the controller 40 according to the first embodiment of the present invention. The controller shown in FIG. 4 is configured to include a delivery request processing unit 40a, a database (network information database) 10, a path control unit (delivery path and delivery path control unit) 25, a router/server control unit (router and server control unit) 40*b*, and a load information collecting unit 41.

Note that the delivery request processing unit 40*a*, the database 10, and the like may be spread to be installed at desired positions on the CDN 140.

(1-6-1) Delivery Request Processing Unit 40*a*

The delivery request processing unit 40*a* receives and processes delivery requests (content delivery request messages) from the client device 30. Further, the delivery request processing unit 40*a* receives delivery requests from the client device 30, and inputs, to the path control unit 25, the addresses of routers 1-6 to which the client device 30 is connected. Moreover, if the band subject to quality assurance is set, the delivery request processing unit 40*a* inputs a request band value in addition to the address.

Further, when the delivery request processing unit 40*a* receives a delivery request of a specific content such as a popular movie, the delivery request processing unit 40*a* informs the path control unit 25 of the reception of the delivery request. Here, a method of recognizing the reception of a delivery request for a specific content by the delivery request processing unit 40*a* is, for example, to judge whether a unique selection ID (Identification) given to the specific content is included in the delivery request.

The user selects a desired movie or the like to be delivered on the browser (Web screen) displayed on the display 30*d* (see FIG. 2) of the client device 30. Information on the selected movie or the like is shown with, for example, the selection ID uniquely given to the content. The selection ID is transmitted to the client side router 1 while the information in a "html", "shtml" or "xml" file format or the like is made into a packet.

The delivery request processing unit 40*a* and the client device 30 may be connected by using a telephone line, or over the CDN 140, or using an interface other than these.

(1-6-2) Database 10 (See FIG. 4)

The database 10 retains, for example, respective delivery server costs of three delivery servers 1*a*-3*a*, and respective individual link costs of thee delivery paths between three delivery server side routers 3, 4 and 6 and the client side router 1. The database 10 retains, for example, individual link costs between adjacent routers for each of the three delivery paths (router 1, router 2, router 3), (router 1, router 5, router 4), and (router 1, router 5, router 6) shown in FIG. 1.

Here, the cost values retained in the database 10 will be further explained in detail with reference to FIG. 5. In the following explanation, an individual link cost from a router R1 (R1 represents a natural number) to a router R2 (R2 represents a natural number) is indicated as a link R1-R2, and an individual link cost in the reverse direction from the router R2 to the router R1 is indicated as a link R2-R1. Further, the cost of the second delivery path is indicated by the sum of a link 1-5 and a link 5-4, and the sum of a link 4-5 and a link 5-1. Links other than these are also indicated similarly.

Figure 5:
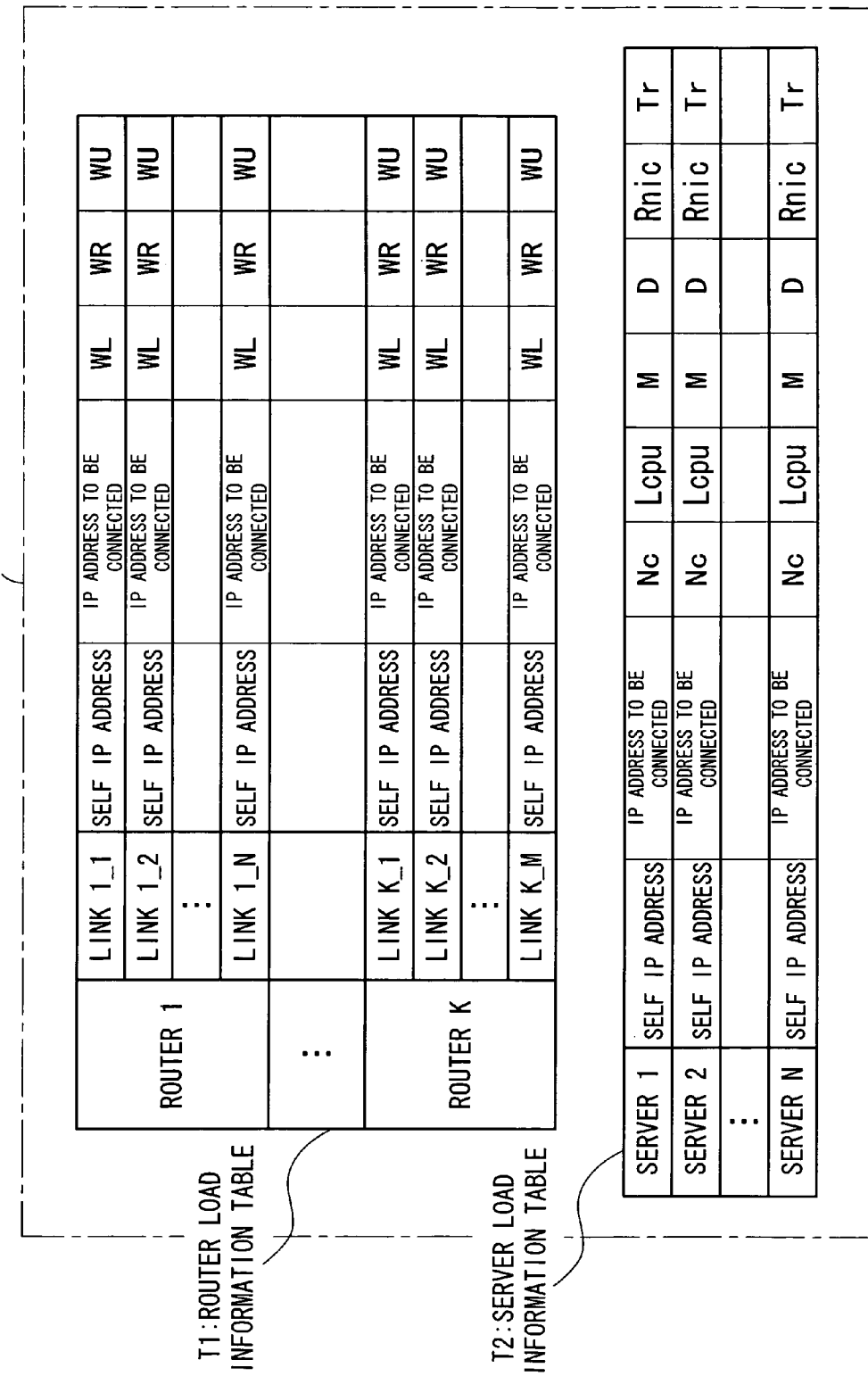
FIG. 5 is a chart showing exemplary contents retained in a database according to the first embodiment of the present invention.

FIG. 5 is a chart showing exemplary contents retained in the database 10 according to the first embodiment of the present invention. The database 10 shown in FIG. 5 contains a router load information table T1 for retaining load information of respective routers 1-6 in the CDN 140, and a delivery server load information table T2 for retaining load information of respective delivery servers 1*a*-3*a*. Here, the router load information table T1 retains, for each of the K numbers (K represents a natural number) of routers 1, 2, - - - K provided within the CDN 140, individual link costs (shown as link 1-1 and the like) between the routers 1, 2, . . . , K and routers connected thereto, physical topology for each individual link cost, and statistical information for the topology, by corresponding them to one another.

Here, the contents of the statistical information data retained in the router load information table T1 and in the server load information table T2 shown in FIG. 5 will be further explained in detail.

In the router load information table T1, WL, WR, and WU show a physical band of the link, a reserved band of the link, and a used band of the link actually used (actually used band), respectively. Further, Nc in the server load information table T2 indicates the number of clients (the number of client devices 30) to which the delivery servers 1*a*-3*a* can connect simultaneously, Lcpu indicates the CPU utiliaztion, M indicates the memory volume of each of the delivery servers 1*a*-3*a*, D indicates the disk utilization of each of the delivery servers 1*a*-3*a*, Rnic indicates the number of transfer bytes per unit hour outputted from each of the delivery servers 1*a*-3*a*, and Tr (Tresp) indicates the response time of each of the delivery servers 1*a*-3*a*.

In other words, the database 10 retains the network costs.

For example, the router 1 is physically connected to each of the routers 2 to N (N represents a natural number), and the database 10 retains an individual link cost between the routers 1 and 2 (link 1-2), and the address of the router 1 itself (self address) and the address of the router 2 (IP address to be connected), corresponding to the link 1-2.

Further, each individual link cost is a link cost between adjacent routers such as routers 1 and 2, and means bidirectional link costs for (router 1, router 2, router 3), (router 1, router 5, router 4), and (router 1, router 5, router 6) provided on the first to third delivery paths described above respectively. The individual link costs are collected by the load information collecting unit 41 as network information or statistical information to be written in the database 10 by the load information collecting unit 41.

Further, the delivery server load information table T2 shown in FIG. 5 retains physical topologies between the delivery servers 1*a*-3*a* and the delivery server side routers 3, 4 and 6 connected to the delivery servers 1*a*-3*a*, and the statistical information for the topologies, by corresponding them to one another, respectively.

In other words, the database 10 retains topology data showing the topologies between respective routers 1-6 and the delivery servers 1*a*-3*a* as initial data, and the topology data in the database 10 is adopted to be updated based on the costs of the respective routers 1-6, the respective delivery servers 1*a*-3*a* and the like collected by the load information collecting unit 41.

Note that although the router load information table T1 and the delivery server load information table T2 are contained in separate tables or memory areas, they may be provided in a different storage medium, and a desired structure may be applied to the data structure of the database 10.

(1-6-3) Path Control Unit 25

Next, the path control unit 25 determines the minimum cost delivery path having the minimum cost among ,for example, three delivery paths, based on the sums of the delivery server costs and individual link costs retained in the database 10. When the path control unit 25 receives a delivery request from the client device 30, the path control unit 25 refers to the network statistic information and the topologies retained in the database 10, searches for a delivery path satisfying the delivery request, and sets a path to the delivery path determined by the search.

Specifically, the database 10 retains bidirectional individual link costs in a direction from one, for example, router 1 to the other router 2 and a direction from the other router 2 to the one router 1 for individual link costs between adjacent routers among the six routers 1-6, and the path control unit 25 uses the bidirectional individual link costs so as to determine a set of a delivery server 1a, 2a or 3a and a delivery path, in which the sum of the link costs and the delivery server cost becomes minimum, as the minimum cost delivery path.

Further, in the path control unit 25, a delivery path calculation unit (calculation unit) 25a capable of performing Dijkstra calculation may be provided separately. The path control unit 25 or the delivery path calculation unit 25a performs Dijkstra calculation while taking into account the delivery path loads and the delivery server loads based on the load information of the routers 1-6 and the delivery servers 1a-3a collected by the load information collecting unit 41 and the request band information received from the delivery request processing unit 40a, and determines the optimum set of a delivery path and a delivery server 1a, 2a or 3a. As a result of the Dijkstra calculation, addresses of routers 1-6 on the path through which packets pass and the address of the delivery server 1a, 2a or 3a are outputted and informed to the router/server control unit 40b.

Further, the path control unit 25 can take various parameters as server costs.

(1-6-4) Router/Server Control Unit 40b

The router/server control unit 40b sets connections for delivering contents to each of the routers 1-6 provided on the minimum cost delivery path determined by the path control unit 25. Further, the router/server control unit 40b is also adopted to output a notification (delivery start notification) to start delivery of contents to the servers 1a-3a. With the router/server control unit 40b, the delivery path determined by the path control unit 25 is set to the routers 1-6.

In detail, connections by the router/server control unit 40b is set by using an MPLS (Multi-Protocol Label Switching) label path. Specifically, the router/server control unit 40b inputs addresses of routers 1-6 on the selected delivery path to routers 1-6 connecting to the selected delivery server 1a, 2a or 3a, and instructs to set the label path according to the addresses. This setting of the delivery path can be done by using RSVP-TE protocol (Resource Reservation Protocol with Traffic Engineering extensions) which is a signal protocol for connection setting. Further, the router/server control unit 40b informs the selected delivery server 1a, 2a or 3a of a transmission start at the time when the delivery path has been set, and starts delivering of the content.

Note that the RSVP-TE is an extension of the RSVP in which label distribution function is added to each path, and is used for setting label exchange paths in a network supporting the MPLS, as well-known.

(1-6-5) Load Information Collecting Unit 41

The load information collecting unit 41 is capable of collecting (or observing) both of the server costs of the three delivery servers 1a-3a and respective individual link costs (individual link costs between adjacent routers among the routers 1-6), and updating the database 10 with the collected server costs or individual link costs.

Figure 6:
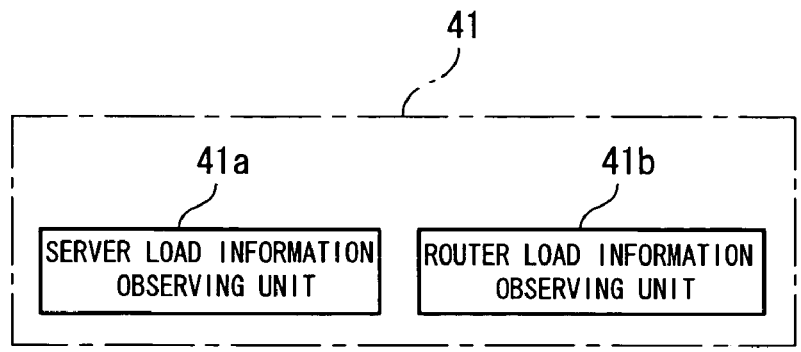
FIG. 6 is a block diagram showing a load information collecting unit according to the first embodiment of the present invention.

FIG. 6 is a block diagram showing the load information collecting unit 41 according to the first embodiment of the present invention. The load information collecting unit 41 shown in FIG. 6 is configured to include: a delivery server load information observing unit (first collecting unit) 41a capable of collecting server costs of the delivery servers 1a-3a and updating the database 10; and a router load information observing unit (second collecting unit) 41b capable of collecting respective individual link costs and updating the database 10.

Accordingly, the controller 40 can grasp respective costs of the routers 1-6 and the delivery servers 1a-3a regularly, based on the initial data stored in the database 10 having been set by the network operator and the load information of the routers 1-6 and the delivery servers 1a-3a themselves collected from the routers 1-6 and the delivery servers 1a-3a periodically. Thereby, the optimum delivery path can regularly be obtained by the Dijkstra calculation.

In this way, the load information about the respective routers and delivery servers can be monitored regularly, whereby a delivery path can be selected appropriately corresponding to the load changes.

(1-6-6) Exemplary Configuration of Autonomous Distribution Type

The controller 40 is provided at one place separating from the CDN 140, and capable of performing a control of a concentrated control server type. Alternatively, the controller 40 may be provided inside the CDN 140.

The streaming delivery system 100 includes the controller 40 or a device having the function of the controller 40 provided within any one of the routers 1-6.

Further, a part of the function module of the controller 40 may be provided to a device other that the controller 40. For example, the database 10, the load information collecting unit 41 and the like may be provided inside each of the routers 1-6. Thereby, an autonomous distributed type network may be used.

Accordingly, the streaming delivery system 100 of the present invention includes: the CDN 140 having delivery servers 1a-3a for delivering contents responding to delivery requests from the client device 30 receiving the contents; the database 10 for retaining server costs of the delivery servers 1a-3a and individual link costs for the delivery paths P1-P3 between the delivery server side routers 3, 4 and 6 and the client side router 1; the server load information observing unit (first collecting unit) 41a capable of collecting the server costs of the delivery servers 1a-3a and updating the database 10; the router load information observing unit (second collecting unit) 41b capable of collecting the individual link costs and updating the database 10; the path control unit 25 for determining the minimum cost delivery path having the minimum cost among the delivery paths P1-P3 based on the sums of the server costs and the respective individual link costs retained in the database 10; and the router/server control unit 40b for setting connections for delivering contents to respective the routers 1-6 provided on the minimum cost delivery path determined by the path control unit 25.

Thereby, both of the load increase in the delivery servers 1a-3a and the cache servers and the load increase in the CDN 140 can be avoided, and the optimum set of a delivery path and a delivery server can be selected. This enables a stable content delivery, whereby the CDN 140 of high reliability can be realized.

(1-7) Explanation of Schematic Processing

With this configuration, when a content transfer request is made to the CDN 140 from, for example, the client device 30, the load information collecting unit 41 considers the costs (the number of connecting terminals) and the delay time of the CDN 140 and the costs (CPU utilization, delay time, or the like) of plural delivery servers 1a-3a in which the content requested from the client device 30 is stored, and selects the optimum set of a delivery path and a delivery server 1a, 2a or 3a so as to suppress an increase in the load of each of the client device 30 and the delivery servers 1a-3a.

Specifically, the load information collecting unit 41 selects a set of a delivery path and a delivery server 1a, 2a or 3a in which the sum of the link costs and the delivery server cost becomes minimum, as the optimum set of a delivery path and a delivery server 1a, 2a or 3a, by using such parameters as the link cost of the CDN 140 or the network cost (link cost value)

indicating the cost of the CDN 140, and the delivery server costs (delivery server cost values) indicating the costs of the delivery servers 1a-3a.

Although calculation of delivery paths in the controller 40 may be performed in bidirections including a direction from the delivery servers 1a-3a to the client device 30 and in a direction from the client device 30 to the delivery servers 1a-3a, in the first embodiment, the total cost is calculated along a direction from the delivery servers 1a-3a to the client device 30.

In this way, a stable content delivery can be done against a large amount of loads in the streaming delivery system 100. Further, the loads on the CDN 140 or the delivery servers 1a-3a are reduced, and the loads on the CDN 140 or the delivery servers 1a-3a are balanced.

This is the schematic configuration of the streaming delivery system 100.

(2) Next, as for a method of calculating delivery paths in the streaming delivery system 100, three methods (A1) to (A3) will be explained.

(A1) Explanation about a method (first method) of calculating delivery paths from the delivery servers 1a-3a to the client device 30 separately.

In a first method, when the path control unit 25 receives a transfer request for a specific content from the client device 30 for example, the path control unit 25 calculates delivery paths from the delivery server side routers 3, 4 and 6 to the client side router 1 (see P1-P3 shown in FIG. 1), calculates the sum of the link costs and the delivery server cost for each of the three delivery paths P1-P3, and selects a set of any one of the delivery servers 1a-3a and a delivery path having the minimum cost as a set of a delivery server and a delivery path for actual delivery. Note that a trigger to start the calculation may be inputted by the network operator.

Here, a delivery path means a passing path from a router 1, 2, 3, 4, 5 or 6 connected to a delivery server 1a, 2a or 3a to a router 1, 2, 3, 4, 5 or 6 connected to the client device 30 in a transfer direction of a content.

Thereby, the client device 30 transmits a delivery request for a content A to the controller 40. When the controller 40 receives the delivery request, the controller 40 calculates the optimum delivery path and delivery server 1a, 2a or 3a based on the topology information and the load information held by itself. The calculation of the delivery path is performed by using a Dijkstra algorithm generally used as a transfer path calculation algorithm (referred to as Dijkstra calculation).

(A1-1) A Dijkstra algorithm is an algorithm for searching for a transfer path with the minimum link cost based on the link costs between a desired stating router (router 1, for example) within the CDN 140 and routers (routers 2-6, for example) other than the starting router 1. For the link cost, parameters shown in the following I to IV may be used.

I. Inverse number of link utilization,
 II. Inverse number of link free band,
 III. Fixed value, and
 IV. Delay time (link delay time).

Then, the controller 40 performs Dijkstra calculations three times in total for transfer paths from, for example, each of three routers 3, 4 and 6 to the router 1.

I. and II. As for inverse number of link utilization or inverse number of link free band.

When the inverse number of link utilization or the inverse number of free band is used as the link cost, the link free band becomes larger as the link cost becomes smaller. That is, when the load is reduced, the band which can be used for transmission increases. Accordingly, the minimum cost transfer path calculated by using the Dijkstra algorithm represents a transfer path having the largest free band within the CDN 140.

III. As for fixed values.

The routers 1-6 generally use fixed values such as "1" and "5" corresponding to the pass hop numbers as link costs. That is, the link costs are shown by the number of routers 1-6 through which a packet passes on a transfer path. Accordingly, when the fixed value is set to "1", the minimum cost transfer path is the shortest hop transfer path. Thereby, setting and processing of link costs are simplified.

The setting of fixed values is performed by the network operator directly writing into memories of the routers 1-6, or by simply recording fixed values such as "1" and "5" in the memories of the routers 1-6 at the time of shipment or the like.

IV. As for link delay time.

The link delay time can be used as a link cost directly, and the minimum cost transfer path is indicated by the minimum delay transfer path. A link cost using the link delay time is calculated by a measurement of the link delay time.

On the other hand, the calculation method using the link delay time is more difficult comparing with a calculation method in which the used band within the CDN 140 is observed, like the inverse number of the link utilization or the inverse number of the link free band (aforementioned I, II).

Therefore, in the following explanation, the path control unit 25 of the controller 40 assumes the link delay time based on the band information of the link (for example, link utilization or link free space) collected (or observed). Hereinafter, a method of assuming the link delay time will be explained in detail.

(A1-2) Method of assuming link delay time

A link delay time d is calculated by summing a packet processing delay time (link processing delay time) $d_1$ and a propagation delay time $d_2$ of a controlled packet. Here, the packet processing delay time $d_1$ is a time period required for a router 1, 2, 3, 4, 5 or 6 to output a packet to the link between the router 1, 2, 3, 4, 5 or 6 and the adjacent router. This depends on the packet transfer rate in the link, that is, the packet transfer band B. Further, the propagation delay time $d_2$ depends on the physical distance D of the link through which the packet propagates. The distance D is, specifically, a distance that data bits propagates through a physical transmission medium used as a link.

Accordingly, the link delay time d is calculated by summing the function f(B) depending on the packet transmission band B and the function f(D) depending on the distance D (see equation (1)).

$$\text{Link delay time } d = d_1 + d_2 = f(B) + f(D) \tag{1}$$

Further, assuming that the physical band of the link is $B_L$, and the actually used band of the packet propagating the link is $B_u$, the link utilization (link used band) ρ is obtained by an equation (2A), and the packet processing delay time $d_1$ is obtained by an equation (2B) using the matrix theory.

$$\text{Link utilization } \rho = B_u/B_L \tag{2A}$$

$$\text{Packet processing delay time } d_1 = h \times (\rho/(1-\rho)) \tag{2B}$$

Here, "/" and "×" indicate division and multiplication, respectively, and h indicates an average retain period of a packet in a router 1, 2, 3, 4, 5 or 6. Accordingly, the packet processing delay time $d_1$ is assumed based on the link utilization ρ. Note that the used band $B_u$ of a packet may be substituted with the sum of reserved bands in a quality insured service or the like, or the occupied band of a packet transmitted through the link.

On the other hand, the propagation delay time $d_2$ depends on the distance D. Here, a time period required for data bits to propagate a unit distance through the link media is constant. When this time period is indicated by a constant c, the propagation delay time $d_2$ is represented as an equation (3).

$$\text{Propagation delay time } d_2 = c \times D \qquad (3)$$

Note that as the constant c, 5 nsec (nanosecond) per meter is used generally. Accordingly, the propagation delay time $d_2$ can be determined based on the distance D, and the link cost $C_L$ is obtained by an equation (4).

$$\text{Link cost } C_L = d = h \times (\rho/1-\rho)) + c \times D \qquad (4)$$

By using the equation (4), the path control unit 25 calculates link costs between a number of adjacent routers within the CDN 140.

Accordingly, the path control unit 25 determines the minimum cost delivery path on the basis of the packet processing delay time $d_1$ assumed based on each link utilization $\rho$, and of the propagation delay time $d_2$ depending on each distance D, as respective individual link costs.

In this way, the controller 40 can select the minimum cost transfer path relating to packet transfer paths within the CDN 140, by using the Dijkstra calculation based on costs of the CDN 140 or links.

(A1-3) As for Cost Values Indicating Costs of Delivery Servers 1a-3a

The controller 40 selects a delivery path and delivery server by taking into account the costs of the delivery servers 1a-3a, in addition to the costs of the CDN 140 or the links. Therefore, the path control unit 25 of the controller 40 replaces the load states of the delivery servers 1a-3a with cost values.

In other words, the path control unit 25 determines a set of a delivery server 1a, 2a or 3a and a delivery path for each of the three delivery paths P1-P3 by using individual link costs in a direction from the delivery server side routers 3, 4 and 6 to the client side router 1, or in a direction from the client side router 1 to the delivery server side routers 3, 4 and 6.

As for the server cost values of the delivery servers 1a-3a, the path control unit 25 determines the minimum cost delivery path based on respective values of the delivery servers 1a-3a observed by the load information collecting unit 41 as described in the following (W1) to (W7), as delivery server costs.

(W1) The number Nc of the client devices simultaneously connected to the delivery servers 1a-3a.

The delivery server cost is determined based on the value of the ratio of the number of client devices 30 being connected to the delivery servers 1a-3a to the number of client devices 30 permitted to connect to the delivery servers 1a-3a.

(W2) CPU utilization $U_{CPU}$ of delivery servers 1a-3a.

The delivery server cost is determined based on the load information of one or a plurality of processors among the delivery servers 1a-3a.

(W3) Memory amount $U_{memory}$ of delivery servers 1a-3a.

The delivery server cost is determined based on the memory used amount of the delivery servers 1a-3a.

(W4) Disk used amount $U_{disk}$ of delivery servers 1a-3a.

The delivery server cost is determined based on the disk used amount of the delivery servers 1a-3a.

(W5) The number of transferred packets $P_{OUT}$ outputted per unit hour from delivery servers 1a-3a.

The delivery server cost is determined based on the value obtained from the ratio of the number of packets outputted per unit hour from the delivery servers 1a-3a to the maximum number of packets capable of being outputted per unit hour from the delivery servers 1a-3a. In other words, the number of outputted packets is used as an interface between the delivery servers 1a-3a and the CDN 140.

(W6) The number of transferred bytes $R_{OUT}$ outputted per unit hour from delivery servers 1a-3a.

The delivery server cost is determined based on the ratio of the number of transferred bytes outputted per unit hour from the delivery servers 1a-3a to the maximum number of transferred bytes capable of being outputted per unit hour from the delivery servers 1a-3a. In other words, the number of transferred bytes is used as an interface.

(W7) The response time $T_{RESP}$ of delivery servers 1a-3a.

The delivery server cost is determined based on the response time required for the delivery servers 1a-3a to output a response message corresponding to a received transfer request. The response time corresponds to a processing time of the delivery servers 1a-3a.

All of the (W1) to (W7) represent costs of the delivery servers 1a-3a. Various costs observed for the delivery servers 1a-3a may be used independently as the delivery server costs, or be used in combination.

Further, the path control unit 25 may use the load states of the processors of the routers 1-6, and determines the delivery server costs by using the CPU utilization of the routers 1-6.

Hereinafter, a method of obtaining the delivery server costs by combining the CPU utilization of the delivery servers 1a-3a and the data output rate (the number of transferred packets or the number of transferred bytes) from the delivery servers 1a-3a will be explained as an example.

One index showing the server costs of the delivery servers 1a-3a is a processing time starting from the time when the delivery server 1a, 2a or 3a receives a request message for a service provision from the client device 30 until the delivery server 1a, 2a or 3a starts providing the requested service. An example of the processing time is a period starting from the time when the delivery server 1a, 2a or 3a receives the delivery request until the delivery server 1a, 2a or 3a transmits a packet including the requested content. Further, a second example of the processing time is a period, in a network game such as a TV game of communicative type over the CDN 140, from the time when a delivery server 1a, 2a or 3a receives a control message from the client device 30 until the delivery server 1a, 2a or 3a transmits a response message to the client device 30 in accordance with the control message.

In the two examples, assuming that the processing time is T in both cases, the controller 40 performs processing by dividing T into roughly two kinds of parts. That is, the controller 40 performs processing by dividing T into: a processing time (CPU processing time) $T_1$ during which a delivery server 1a, 2a or 3a processes the received delivery request by the CPU of the delivery server 1a, 2a or 3a itself; and a time $T_2$ starting from the time when the delivery server 1a, 2a or 3a completes the CPU processing until it outputs a reply message to the CDN 140 via the interface of the delivery server 1a, 2a or 3a itself.

Here, the CPU processing time $T_1$ depends on the CPU utilization. The reason is as follows. That is, a new delivery request which has reached a delivery server 1a, 2a or 3a is queued temporarily in a buffer (not shown) in the delivery server 1a, 2a or 36a, and according to an increase in the CPU utilization, the CPU is allocated to processing other than the queue processing, whereby the reached delivery request is remained being queued. Accordingly, the CPU processing time $T_1$ is represented by a function $f(U_{CPU})$ of the CPU utilization, and the CPU processing time $T_1$ becomes longer as the CPU utilization increases.

On the other hand, the time $T_2$, starting from the time when the delivery server 1a, 2a or 3a completes the CPU processing until it outputs a reply message to the CDN 140, is used in the same way as the packet processing time in the aforementioned link cost. That is, for the speed $P_{OUT}$ (or $R_{OUT}$) that the delivery server 1a, 2a or 3a outputs a packet to the CDN 140, the band utilization of the interface of a delivery server 1a, 2a or 3a, and the process delay of the interface of a delivery server 1a, 2a or 3a are obtained by using equations (5) and (6), respectively.

Band utilization ρ of interface of delivery
server=$P_{OUT}/B_{NIC}$ (5)

Process delay $d_{OUT}$ of interface of delivery server=$h \times (\rho/(1-\rho))$ (6)

Here, $B_{NIC}$ is a physical transfer speed of the interface of a delivery server 1a, 2a or 3a, and h is an average retention period of a packet. Accordingly, the processing time T is obtained by an equation (7A).

Processing time $T = f(U_{CPU}) + h(\rho/(1-\rho))$ (7A)

Then, the controller 40 uses the processing time T as the cost $C_S$ of each delivery server 1a, 2a or 3a, so that the controller 40 can select a delivery server 1a, 2a or 3a having the minimum processing time T among the delivery servers 1a-3a.

Note that the method in which the processing time of delivery servers 1a-3a is processed by using the CPU utilization can be applied to the calculation of the CPU processing time of routers 1-6. That is, a processing time period $T_P$ required for packet processing by the routers 1-6 is shown by an equation (7B).

Processing time $T_P = f(U_{CPU})$ (7B)

The controller 40 can obtain a link cost in which a delay effect of the CPU load is added by adding the processing time $T_P$ to the equation (7A) for the link cost.

Here, assuming that the respective sums of the link costs of the minimum cost transfer paths searched through the aforementioned Dikjstra calculation are $SC_{L1}$, $SC_{L2}$ and $SC_{L3}$. Further, the respective server costs of the delivery servers 1a-3a connected to the routers 3, 4 and 6 retained by the controller 40 are $C_{S1}$, $C_{S2}$ and $C_{S3}$. Then, the respective total costs $T_{C1}$, $T_{C2}$ and $T_{C3}$ are calculated by adding the sums of the costs of the transfer path and the delivery servers 1a-3a, respectively.

$T_{C1} = a \times SC_{L1} + \beta \times C_{S1}$ $T_{C2} = a \times SC_{L2} + \beta \times C_{S2}$ $T_{C3} = a \times SC_{L3} + \beta \times C_{S3}$ Here, each a and β is a constant. For example, each a and β takes a value from 0 to 1 which is determined depending on which of the delivery servers 1a-3a or the CDN 140 is weighted heavily. Note that for these values, values obtained through experiences, or values obtained through simulations may be used usually.

The total cost is an index obtained by considering both the load of the CDN 140 and the load of the delivery server 1a, 2a or 3a. A set of a transfer path and a delivery server 1a, 2a or 3a having the smallest $T_{C1}$-$T_{C3}$ is selected as the delivery path and the delivery server 1a, 2a or 3a for the requested content. This enables to avoid both of the load increase in the delivery servers 1a-3a and the load increase in the CDN 140.

Further, in calculating the sum of the link cost and the delivery server cost, a weighted parameter which may be designated from the outside (for example, network operator) is used. The path control unit 25 determines the minimum cost delivery path by using those weighted for the individual link costs and the servers costs of the delivery servers 1a-3a, respectively.

Thereby, at the time of calculating the total costs, it is possible to perform the cost calculation while placing a heavy weight on an influence of the load of the CDN 140. Alternatively, it is also possible to perform the cost calculation while placing a heavy weight on an influence of the load of the delivery servers 1a-3a. Thereby, the cost calculating method can be adjusted by the intention of the network operator.

Note that in a case where a quality assurance request such as a band is included in the delivery request, the controller 40 determines whether the link band satisfies the requested band, and makes the link cost of the link band not satisfying the requested band infinite, or eliminates it from the calculation objects so as not to include the link in the minimum cost transfer path, in the Dikjstra calculation. This method is feasible by using the transfer path calculating method to the GS flow proposed by the present inventors.

With this configuration, a method of determining a delivery path by the controller 40 of the streaming delivery system 100 according to the first embodiment of the present invention will be described in detail with reference to FIGS. 7 and 8.

Figure 7:
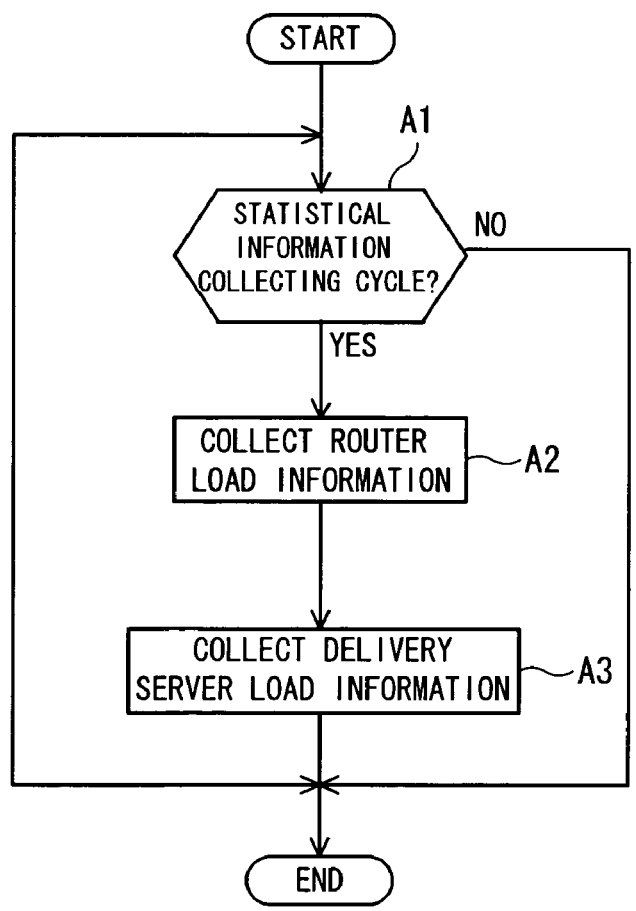
FIG. 7 is a flowchart for explaining a load information collecting method according to the first embodiment of the present invention.

FIG. 7 is a flowchart for explaining a method of collecting load information according to the first embodiment of the present invention.

In step A1, the load information collecting unit 41 checks whether every predetermined cycle or a predetermined time has come, and if the time has not come, it takes No route and ends the processing. In contrast, if the cycle or the time has come in step A1, the load information collecting unit 41 takes YES route, and in step A2, the load information collecting unit 41 accesses the respective routers 1-6 within the CDN 140 and collects statistical information held by the respective routers 1-6.

Here, the load information collecting unit 41 obtains, as statistical information obtained from one of the routers 1-6, transfer amount per unit hour or information on the physical band for the one of the routers 1-6 and a plurality of links between the one of the routers 1-6 and a destination router 1, 2, 3, 4, 5 or 6, and further obtains the address for entering into (interfacing with) the one of the routers 1-6 and the address of the interface of the destination router 1, 2, 3, 4, 5 or 6. Further, the load information collecting unit 41 obtains, from the delivery servers 1a-3a, values indicating the server costs, the addresses of the interfaces of the delivery servers 1a-3a, and the address of the destination interface.

Then, in step A3, the load information collecting unit 41 collects the load information of the delivery servers 1a-3a, and ends the processing. The load information collecting unit 41 stores the collected pieces of the load information in the database 10.

Note that between the load information collecting unit 41 and the respective routers 1-6 and the delivery servers 1a-3a, SNMP (Simple Network Management Protocol, CLI (Command Line Interface), COPS (Common Open Policy Service) or the like is used as a protocol for transferring the load information (cost information).

In this way, the controller 40 can collect respective costs between the routers 1-6 and the delivery servers 1a-3a.

Figure 8:
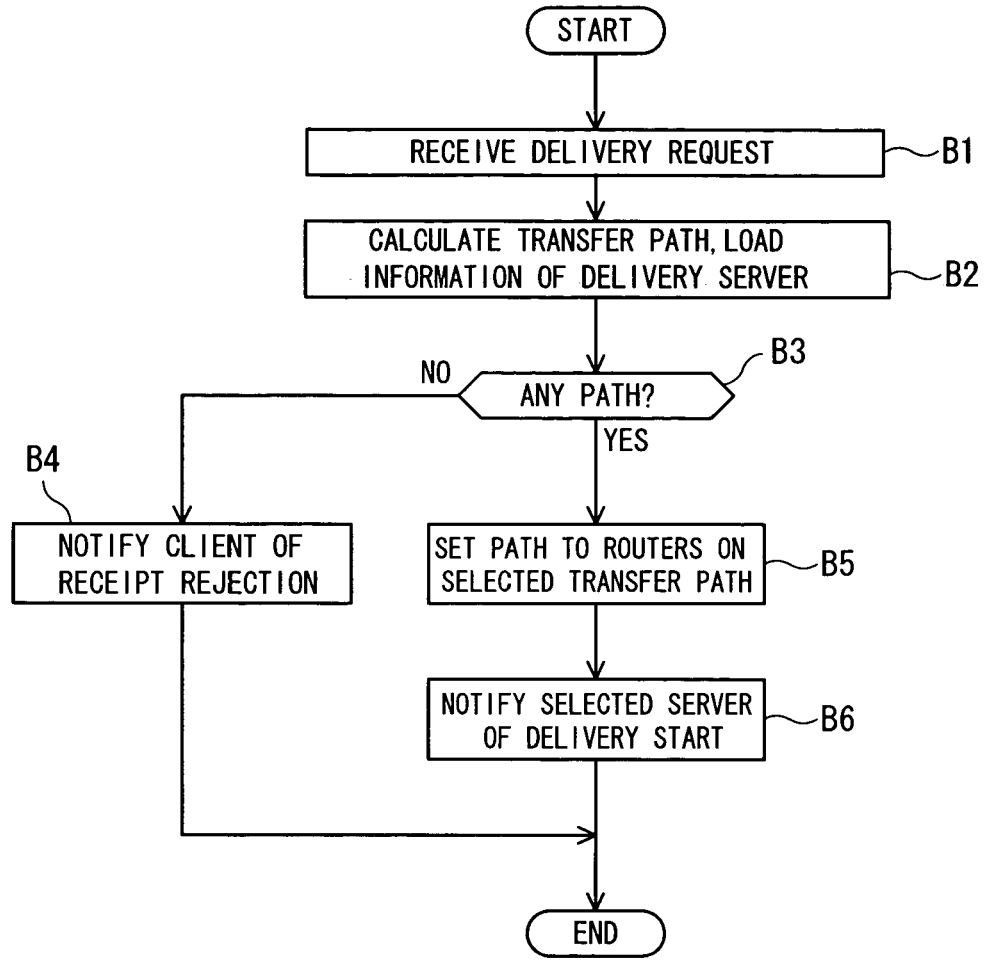
FIG. 8 is a flowchart for explaining a delivery path determining method according to the first embodiment of the present invention.

FIG. 8 is a flowchart for explaining a method for determining a delivery path according to the first embodiment of the present invention.

First, when the control server 40 receives a delivery request from a user (step B1), the control server 40 calculates respective costs of transfer paths and the delivery servers 1a-3a through Dijkstra calculation (step B2), and determines whether there is a transfer path based on the result of the Dijkstra calculation (step B3).

Here, if there is no transfer path, the control device 40 takes No route, that is, informs the user of a receipt rejection and ends the processing (step B4). In contrast, if there is a transfer path in step B3, the controller 40 selects a set of a delivery server 1a, 2a or 3a and a delivery path among a plurality of sets, and then takes YES route. Further, in step B5, the controller 40 sets a path for actually delivering the content on respective routers 1-6 provided in the selected set of transfer path, and in step B6, the controller 40 informs the delivery server 1a, 2a or 3a in the selected set of starting the delivery of the content.

Accordingly, the method for determining a delivery path of the present invention is performed in the streaming delivery system 100 having a plurality of delivery server side routers 3, 4 and 6 communicating with a plurality of delivery servers 1a-3a for delivering contents, and a client side router 1 communicating with the client device 30 receiving the contents.

First, the controller 40 collects the delivery server cost of one or a plurality of delivery servers 1a-3a, and collects individual link costs between adjacent routers collected from adjacent routers among six routers 1-6.

Then, the controller 40 calculates the sums of the delivery server costs and individual link costs by the Dikjstra calculation, to thereby determine the minimum cost delivery path having the minimum cost among, for example, three delivery paths based on the sums.

In this way, both of the load increase in the content delivery servers 1a-3a and in the delivery servers 1a-3a such as cache servers in the streaming delivery system 100 and the load increase in the CDN 140 are avoided, and the optimum set of a delivery path and a delivery server 1a, 2a or 3a can be selected.

Further, the content delivery CDN 140 of high reliability can be realized in this way.

(A2) Method for efficiently performing delivery path calculation from the delivery servers 1a-3a to the client device 30 (second method).

The second method is for making the delivery path calculating unit 25a in the first method effective further.

The second method is so configured that when the path control unit 25 receives a transfer request for a specific content from the client device 30, the path control unit 25 performs Dijkstra calculation to obtain a delivery path in which the sum of the link cost and the delivery server cost, starting from the client side router 1 up to a delivery server 1a, 2a or 3a, becomes minimum. Here, the difference between the second direction and the first direction will be explained with reference to FIG. 9.

Figure 9:
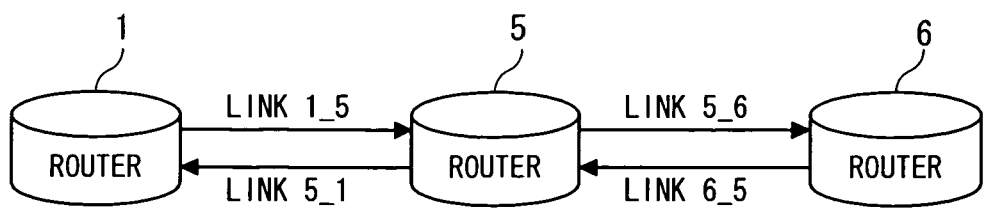
FIG. 9 is a diagram for explaining a delivery path calculating method using a second method according to the first embodiment of the present invention.

FIG. 9 is a diagram for explaining a method for calculating delivery paths using the second method according to the first embodiment of the present invention. Values of the link costs between the routers 1, 5 and 6 shown in FIG. 9 differ between two directions, that is, a direction from the router 1 to the router 6 and a direction from the router 6 to the router 1. This is because the packet volume transmitted between adjacent routers are different by the directions. Accordingly, the database 10 (see FIG. 5) retains link values separately for the same adjacent routers.

In the general Dijkstra calculation, calculation starts from a desired router (node), and the minimum cost delivery path to all other routers is calculated. Further, links from a desired router such as the client side router 1 to the adjacent routers 2 and 5 adjacent to the client side router 1 are searched by referring to the link cost values.

That is, in the general Dijkstra calculation such as the first method, the link cost value in a direction from the client side router 1 to the adjacent routers 2 and 5 is used, whereby a delivery path from the starting router to a router other than the starting router is calculated.

Further, in the Dijkstra calculation, when the link from the first router to the router adjacent to the first router is searched, the cost value in a direction from the adjacent router to the self router is used as the link cost to be used, whereby delivery paths from all delivery servers 1a-3a to the client side router 1 are calculated, and a set of a delivery server 1a, 2a or 3a and a delivery path having the minimum cost is selected as the set of a delivery server 1a, 2a or 3a and a delivery path used for delivery.

In contrast, the path control unit 25 can calculate the minimum cost delivery path starting from the client side router 1 to the delivery server side routers by using the cost value in a direction from the adjacent router to the router 1 (reverse direction to the direction from the router 1 to the adjacent router). This calculation method will be explained in a second embodiment described later.

Further, when comparing respective methods to find the difference by using the number of calculations, Dijkstra calculations are performed three times in the first method, which means that Dijkstra calculations must be repeated for the number of delivery servers 1a-3a from the delivery server side routers 3, 4 and 6 to the client side router 1. In this case, if the scale of the CDN 140 becomes larger so that the number of delivery servers 1a-3a increases, the calculating period of the Dikjstra processing unit may become longer as the number of routers within the CDN 140 increases. This means that a period from a delivery request from the client device 30 to the start of the delivery becomes longer, causing deterioration in the service quality.

On the other hand, in the second method, the path control unit 25 does not perform Dijkstra calculation to obtain delivery paths starting from the delivery server side routers 3, 4 and 6 to the client side router 1, but performs the Dijkstra calculation once starting from the client side router 1, in order to make the delivery path calculation processing efficient.

Further, by using the link cost values in the reverse direction, it is equivalent to calculate the minimum cost from the respective delivery server side routers 3, 4 and 6 to the client side router 1, substantially.

With this configuration, when the path control unit 25 receives a delivery request for, for example, a content A from the client device 30, the path control unit 25 performs Dijkstra calculation starting from the client side router 1. Specifically, when the path control unit 25 searches for links from the client side router 1 making a pair with the adjacent router to the delivery server side routers 3, 4 and 6, the path control unit 25 obtains three kinds of costs from all three delivery server side routers 3, 4 and 6 to the client side router 1, by using the Dijkstra calculation. Further, the path control unit 25 adds the sum of the link costs between adjacent routers and the costs of the delivery servers 1a-3a so as to calculate three kinds of total costs, respectively. Here, derivation of the delivery server costs and the adding method are same as those of the first method.

Then, the path control unit 25 selects a set of a delivery server 1a, 2a or 3a and a delivery path having the minimum cost as a set of a delivery server 1a, 2a or 3a and a delivery path, and as a delivery path from each delivery server side router to the client side router 1, selects the set of the delivery path and the delivery server 1a, 2a or 3a having the minimum total cost as the delivery path and the delivery server 1a, 2a or 3a for delivering the requested content.

Thereby, both of the load increase in the delivery servers 1a-3a and load increase in the CDN 140 can be avoided.

Further, the path control unit 25 may be configured to perform Dijkstra calculation by assuming the cost values of the delivery servers 1a-3a as link costs through another calculation. Thereby, the path control unit 25 can determine the delivery path while considering both of the link costs and the delivery server costs through one Dijkstra calculation.

Note that in the second method, the cost calculation method can be adjusted by the intention of the network operator in such a manner that, when calculating the link costs and the delivery server costs similar to that of the first method, a weighting parameter which can be designated by the outside is used to thereby perform addition, and at the time of calculating the total cost, a cost calculation in which the load influence of the CDN 140 is weighted heavily is performed, or in turn, a cost calculation in which the load influence of the delivery servers 1a-3a are weighted heavily is performed.

In this way, it is possible to calculate delivery paths from all delivery server side routers 3, 4 and 6 to the client side router 1 through one Dikjstra calculation. Accordingly, three times of calculations are not required, so that the efficiency of the calculation is improved obviously, comparing with the first method.

(A3) Another method to effectively perform delivery path calculation from the delivery servers 1a-3a sides to the client device 30 side (third method).

In the third method, a virtual server (virtual node) connected to the delivery servers 1a-3a via virtual links is used relating to the delivery servers 1a-3a within the CDN 140.

Figure 10:
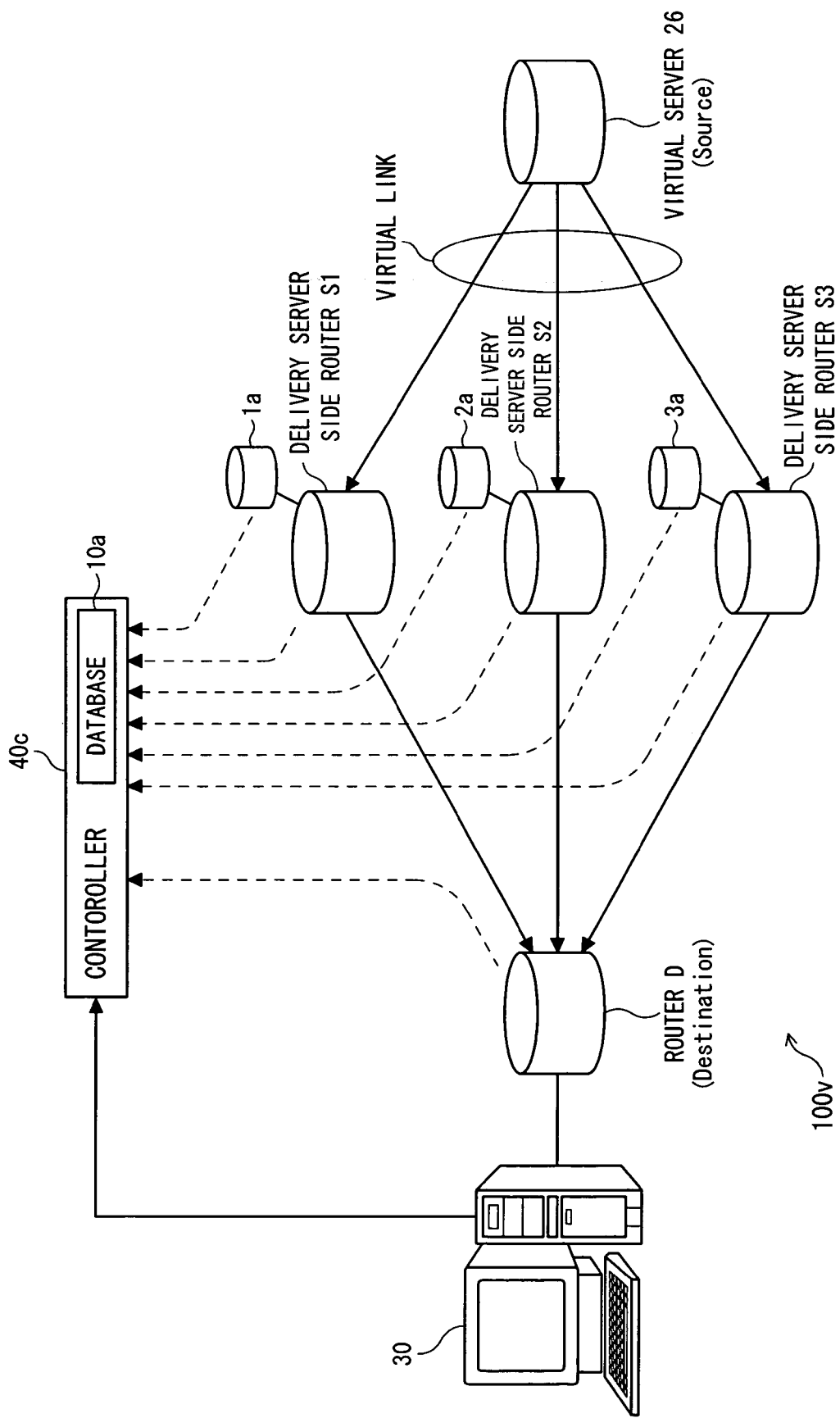
FIG. 10 is a diagram for explaining the delivery path calculating method using a virtual server and virtual links according to the first embodiment of the present invention.

FIG. 10 is a diagram for explaining a method for calculating a delivery path by using the virtual server and the virtual links according to the first embodiment of the present invention. A streaming delivery system model 100v shown in FIG. 10 is for calculating a delivery path in a direction from a source virtual server 26 to a destination router D, and is configured to include the router D, delivery server side routers S1, S2 and S3 connected to the router D, delivery servers 1a-3a connected to the delivery server side routers S1-S3 respectively, and the virtual server 26 connected to each of the delivery server side routers S1-S3. Note that the same reference numerals indicate the same elements as described above.

Here, the router D and the delivery server side routers S1, S2 and S3 have the same function as the client side router 1 and the delivery server side routers 3, 4 and 6, respectively.

The virtual server 26 is connected to each of the delivery server side routers 3, 4 and 6 via the virtual links, and is the starting point in the Dijkstra calculation, and calculates the minimum cost delivery path in a direction from the virtual server 26 to the router D through one calculation, and serves as a virtual source indicating the virtual packet source. Further, since the costs of the delivery servers 1a-3a are used as the costs in the virtual links, there is no need to add costs of the delivery servers 1a-3a additionally.

Accordingly, the path control unit 25 is configured to determine a set of a delivery server 1a, 2a or 3a and a delivery path by using individual link costs in a direction from the virtual server (virtual node) 26, accessing the respective delivery servers 1a-3a via the virtual links, to the router D.

Further, a controller 40c is for retaining data relating to data for load information and statistical information almost similar to the controller 40, and has a database 10a.

FIG. 11 is a chart for explaining the data structure of the database 10a according to the first embodiment of the present invention. The database 10a shown in FIG. 11 is used for path calculation using the virtual server 26. The database 10a contains, for each of the K number of routers 1 to K and the virtual server 26, link costs between adjacent routers among the routers 1 to K and virtual links 1 to S (S represents a natural number) of the virtual server 26, respectively.

In the database 10a shown in FIG. 11, as for the cost retained by, for example, the router 1 (see field of router 1 shown in FIG. 11), the cost between the router 1 and the virtual link 1 (see field indicated as virtual link 1) is retained in addition to the load information between the router 1 and the routers 2 to N, different from the database 10. Further, the database 10a has a field for the virtual server, not included in the database 10, in which physical connection data for the virtual links S1-S3 equivalent to the delivery servers 1a-3a and the like is retained. The database 10a retains statistical information WL, WR and WU for each of the routers 1-6 and the virtual servers 1-3, similar to the database 10. Note that in FIG. 11, the same reference numerals indicate the same items as described above.

With this configuration, in the calculation of delivery paths from the delivery server 26 side to the router D side shown in FIG. 10, the costs of the delivery servers 1a-3a are replaced by link costs equivalently, and all delivery servers 1a-3a are replaced by virtual links, and all of the virtual links are connected to the virtual delivery servers 1a-3a.

When the controller 40c receives a delivery request for a specific content from the client device 30, the controller 40c performs Dijkstra calculation to obtain a delivery path, from the virtual server 26 to the client device 30, with the minimum cost. Note that a trigger to start the Dijkstra calculation may be made by the network operator of the CDN 140 outputting a transfer request.

Then, the path control unit 25 within the controller 40c calculates a delivery path with the minimum cost from the client device 30 to the virtual server 26 periodically or at a predetermined hour, and selects it as a set of a delivery server 1a, 2a or 3a which is the transfer destination of the delivery request from the client device 30 and a delivery path. Thereby, the set of the delivery path and the delivery server S1, S2 or S3 determined by the Dijkstra calculation is selected as a pair of a delivery path and a delivery server S1, S2 or S3 for delivering the requested content.

Further, the method of replacing the costs of the delivery servers 1a-3a with the cost values of the virtual links can be performed by using various values derived as the costs of the delivery servers 1a-3a. Further, a delivery path may be calculated by combining various observed values for the delivery servers 1a-3a, or a delivery path may be calculated by multiplying the actual link costs by a parameter for weighting.

Accordingly, the delivery path calculation processing can be effective and be performed at a high-speed, and both of the load increase in the delivery servers 1a-3a and the load increase in the CDN 140 can be avoided.

Further, when comparing the second method with the third method, the second method performs the Dijkstra calculation only once, but it needs calculations for the number of paths in order to calculate the total costs. On the other hand, the third method can obtain the delivery path with the minimum total cost for each set from each of the delivery server side routers 3, 4 and 6 to the client side router 1 through one Dijkstra calculation, whereby the delivery path calculation becomes effective.

Note that the streaming delivery system 100v can use the global load balancing control system.

As for the function of calculating a delivery path, although the control server 40 of the concentrated control server type connected to respective devices of the CDN 140 is used in the first embodiment, the global load balancing control system can obtain the function of calculating a delivery path by using balanced control provided in one or a plurality of routers within the CDN 140.

In such a case, the one or the plurality of routers retain topologies of a plurality of routers (for example, routers 1-6) and the delivery servers 1a-3a, and periodically observe load information for the routers and respective delivery servers 1a-3a. Accordingly, the routers having the function of calculating a path can grasp costs of the routers, delivery servers and the like regularly.

With this configuration, the client device 30 transmits a delivery request for the content A to the nearest router, and when the router receives the transfer request, the router calculates the optimum content delivery path and delivery server 1a, 2a or 3a based on the topology and the load information that the router grasps by itself.

In this way, both control methods of a concentrated control server type and a balanced control type can be used, and in addition to the aforementioned merits, advantages in operating the CDN 140 can be achieved.

(B) Explanation of Second Embodiment of the Present Invention

A method of selecting and determining a delivery server 1a, 2a or 3a in a second embodiment is to calculate delivery paths from the client device 30 side to the delivery servers 1a-3a side, and using a delivery path with the shortest transfer time of a delivery request outputted from the client device 30.

A streaming delivery system 100b (see FIG. 12 described later) in the second embodiment is also similar to the streaming delivery system 100, and the same reference numerals explained below indicate the same elements as described above. Hereinafter, (B1) and (B2) will be explained.

(B1) Method for calculating delivery paths from the client device 30 side to the delivery servers 1a-3a side separately.

The delivery path calculating method in the path control unit 25 of the second embodiment is different from the calculating method in the path control unit 25 of the first embodiment in that Dijkstra calculation is performed in a direction from the client device 30 to the delivery servers 1a-3a. On the other hand, the same controller 40 as that of the first embodiment can be used.

Further, in the router/server control unit 40b, when a path is set to the determined delivery path, path setting is instructed to a delivery server side router 3, 4 or 6 in the first embodiment. However, in the second embodiment, the client side router 1 is instructed to set a path up to the delivery server side router 3, 4 or 6.

Therefore, the path control unit 25 determines, as a responding path from the delivery server 1a, 2a or 3a that received a transfer request from the client side router 1 to the client side router 1, a set of a delivery server 1a, 2a or 3a, which is the destination of the delivery request, and a delivery path is determined by using individual link costs in a direction from the client side router 1 to the delivery server side router 3, 4 and 6.

Further, when file data is transferred from the client device 30 to the delivery server 1a, 2a or 3a, the path control unit 25 in the first embodiment calculates a delivery path based on a direction of transmitting the content as the delivery path, that is, a direction from the router to which the delivery server 1a, 2a or 3a is connected, to the router to which the client device 30 is connected.

In contrast, in the delivery method of the second embodiment, the client side router 1 directly transfers a control message such as a delivery request to the delivery servers 1a-3a, and based on the cost on the delivery path through which the transfer request is transmitted, a delivery server 1a, 2a or 3a is selected. That is, in the calculating method of the second embodiment, both of the delivery path cost from the client device 30 side to the delivery server side and the costs of the delivery servers 1a-3a are referred to, so as to improve the performance of the content delivery.

Figure 12:
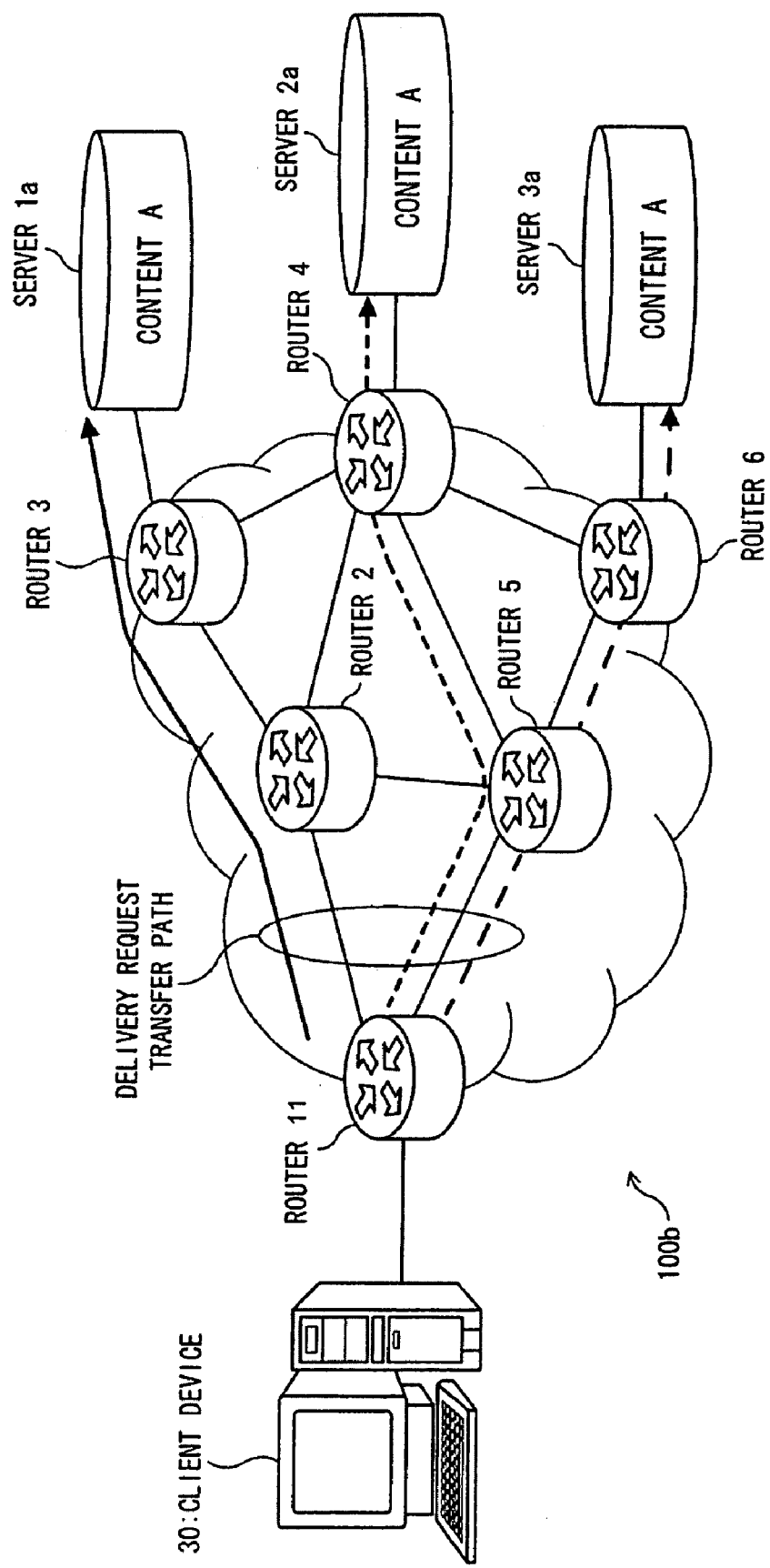
FIG. 12 is a configuration diagram showing a streaming delivery system according to a second embodiment of the present invention.

FIG. 12 is a configuration diagram showing a streaming delivery system according to the second embodiment of the present invention. The streaming delivery system 100b shown in FIG. 12 is configured to include the client device 30, respective routers 11 and 2-6, the delivery servers 1a-3a, and the like.

Further, control in the second embodiment is provided to, for example, the client side router 11 within the CDN 140 so as to control in an autonomous distribution. Note that the control function may be provided to a router other than the client side router 11, or provided to the controller 40 (not shown) of the concentrated control server type.

The client side router 11 has a function of retaining topologies of all routers 11 and 2-6 and delivery servers 1a-3a within the CDN 140, and a function of observing load information of respective routers 11 and 2-6 and delivery servers 1a-3a periodically so as to regularly grasp costs of the respective routers 11 and 2-6, delivery servers 1a-3a and the like.

Note that the elements indicated by the same reference numerals as those described above in FIG. 12 have the same functions as aforementioned.

With this configuration, the client device 30 transmits a delivery request for the content A to the nearest router 11, and when the router 11 receives the delivery request, the control function provided in the router 11 calculates the optimum delivery path and a delivery server 1a, 2a or 3a for the delivery request, based on the topology information and the load information grasped by the router 11 itself.

That is, the router 11 calculates delivery paths from the router 11 to the respective routers 3, 4 and 6. In this method of calculating delivery paths, Dijkstra algorithm is used similar to the calculating method of the first embodiment. Further, as for the delivery server costs of the respective delivery servers 1a-3a, a calculating method similar to the method of calculating delivery server costs in the first embodiment is used.

Then, the router 11 adds the costs of the respective delivery paths and the costs of the delivery servers 1a-3a, and calculates the total costs for respective delivery paths. Here, a set of a delivery path and a delivery server 1a, 2a or 3a having the minimum total cost is selected as the set of a delivery path and a delivery server 1a, 2a or 3a for the delivery request. p In this way, in the second embodiment, both of the load increase in the delivery servers 1a-3a and the load increase in the CDN 140 can be avoided. Further, by using the values similar to the costs in the first embodiment for the cost values of the delivery servers 1a-3a, merits similar to those achieved in the first embodiment can also be achieved.

(B2) Method for effectively performing the delivery path calculation from the client device 30 side to the delivery servers 1a-3a side.

Even in the second embodiment, delivery paths in the case of using a virtual server 50 and virtual links can be calculated by using the database 10a shown in FIG. 11.

Figure 13:
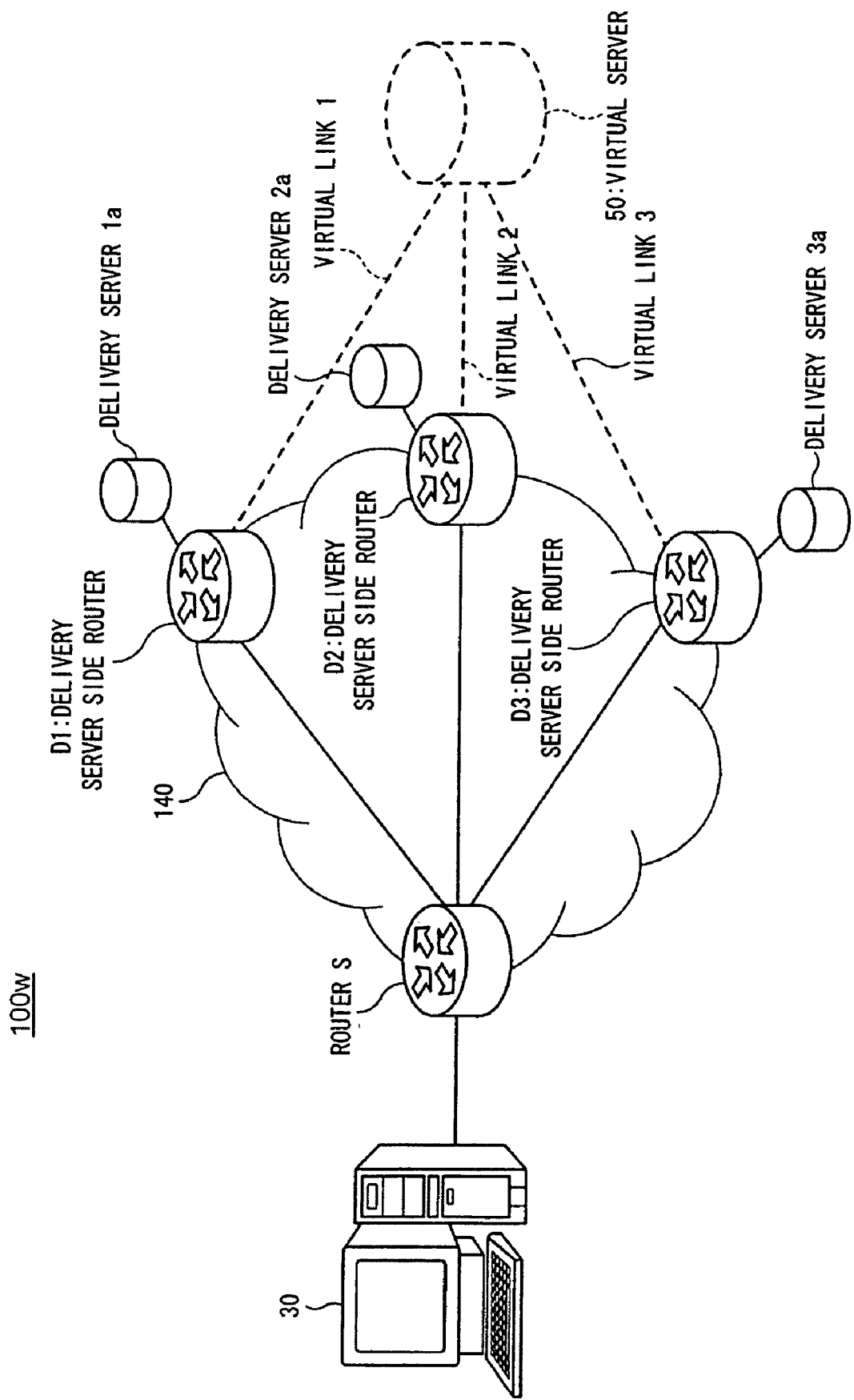
FIG. 13 is a diagram for explaining a second delivery path calculating method according to the second embodiment of the present invention.

FIG. 13 is a diagram for explaining a second method for calculating delivery paths according to the second embodiment of the present invention, in which the virtual server 50 and the virtual links are used. In a streaming delivery system model 100w shown in FIG. 13, the source is the client device 30 and the destinations are delivery server side routers D1, D2, D3. Accordingly, the source and the destinations are reversed comparing with the streaming delivery system model 100v in the first embodiment, and the virtual server 50 and the virtual links are introduced, whereby the delivery path calculation is made to be efficient.

Specifically, a client side router S on the client device 30 side, which is the starting point, calculates delivery paths to the virtual server 50 by using Dijkstra calculation. Through the one calculation, a delivery path of the minimum cost to a delivery server 1*a*, 2*a* or 3*a* is calculated.

Accordingly, since the costs of the delivery servers 1*a*-3*a* are replaced by the cost values of the virtual links, various values derived as the costs of the delivery servers 1*a*-3*a* can be used like the first embodiment, and there is no need to add the costs of the delivery servers 1*a*-3*a* additionally. Further, it is also possible to combine various observed values for the delivery servers 1*a*-3*a*, and to multiply by an adjustment parameter for weighting to the actual link cost values. To this, it is possible to make the delivery path calculation processing effective and be performed at a high speed.

Accordingly, the path control unit 25 is so configured that as a responding path from the delivery server 1*a*, 2*a* or 3*a* that received a transfer request from the client router 1 to the client router 1, the path control unit 25 uses individual link costs in a direction from the virtual server (virtual node) 50 accessing to each of the delivery servers 1*a*-3*a* via virtual links to the client side router 1, and also determines a set of the destination delivery server 1*a*, 2*a* or 3*a* which is the transfer destination of the delivery request and a delivery path, by using individual link costs in a direction from the client side router 1 to the delivery server side routers 3, 4, 6.

Further, the combination of the delivery path and the delivery server 1*a*, 2*a* or 3*a* determined by the Dijkstra calculation is selected as the set of a delivery path and a delivery server 1*a*, 2*a* or 3*a* for the delivery request. Thereby, both of the load increase in the delivery servers 1*a*-3*a* and the load increase in the CDN 140 can be avoided.

In this way, an effective calculation is also possible.

Note that the streaming delivery system 100*w* may use the global load balancing control system. In such a case, the path calculating function is provided to one or a plurality of routers within the CDN 140, whereby a balanced control is used. Here, a router provided with the path calculating function (for example, router 1) retains topologies of, for example, the routers 1-6 and the delivery servers 1*a*-3*a*, and observes load information for the routers and the respective delivery servers 1*a*-3*a* periodically.

With this configuration the client device 30 transmits a delivery request for a content to, for example, the nearest router, and when the router receives the transfer request, the router calculates the optimum content delivery path and delivery server 1*a*, 2*a* or 3*a*, based on the topologies and the load information grasped by the router itself.

In this way, both control methods of concentrated control server type and balanced control type can be used, and in addition to the aforementioned merits, advantages in operating the CDN 140 can be achieved.

(C) Others

The present invention is not limited to the embodiments described above and variations thereof, and may be performed in various modifications within a range of not departing from the spirit of the present invention.

For the interfaces between respective devices in the streaming delivery system 100 (see FIG. 3 and the like), wireless may be used. For example, any interface, among those of an access part between the client device 30 and the router 1, between respective routers, access parts between the routers 3-6 and the delivery servers 1*a*-3*a*, between the client device 30 and the controller 40 or between each router and the controller 40, may be of wireless connection. Thereby, the present invention may be applied to mobile terminals and the like in a mobile communication system.

Further, the transmission system of the present invention is characterized in that, in a transmission system having a plurality of routers for transferring packets, a plurality of routers include a plurality of delivery server side routers 3, 4, 6 communicating with a plurality of delivery servers for delivering contents and the client side router 1 communicating with the client device 30 receiving the contents. Further, the transmission system is configured to include: the database 10 retaining respective server costs of three delivery servers 1*a*-3*a* and respective individual link costs for three delivery paths between the delivery server side routers 3, 4, 6 and the client side router 1; and the path control unit 25 for determining, for example, a delivery path with the minimum cost in which the cost becomes minimum among the three delivery paths, based on the sums of the server costs and the respective individual link costs retained in the database 10.

Here, the server costs retained in the database 10 may not include the server costs of all three servers. For example, predetermined costs (for example, fixed values) may be used for two among the three delivery servers 1*a*-3*a*.

INDUSTRIAL AVAILABILITY

As described above, according to the present invention, both of load increase in content delivery servers and cache servers and load increase in a network can be avoided, and a set of the optimum delivery path and delivery server can be selected, whereby a content delivery network with high reliability can be realized.

What is claimed is:

1. A transmission system having:
a plurality of delivery server side routers which communicate with a plurality of delivery servers for delivering a content; and a client side router which communicates with a client device for receiving the content, the transmission system comprising:
a database that stores server load states of the plurality of delivery servers, and respective individual link load states for a plurality of delivery paths defined between the plurality of delivery server side routers and the client side router; and
a path control unit that determines a minimum load state delivery path having a minimum load state among the plurality of delivery paths, based on sums of the server load states and the respective individual link load states stored in the database, the path control unit using a virtual node connected to the plurality of delivery server side routers via virtual links,
wherein the path control unit replaces the server load states of the plurality of delivery servers with individual link load states in directions from the virtual node via the virtual links, respectively, to the client side router, and determines a set of a delivery server and a delivery path by using the individual link load states.

2. The transmission system as claimed in claim 1, further comprising a load information collecting unit capable of collecting at least either the server load states of the delivery servers or the respective individual link load states, and updating the database with the server load states or the respective individual link load states collected.

3. The transmission system as claimed in claim 1, wherein each of a plurality of routers, provided in the minimum load state delivery path determined by the path control unit, has a router control unit that sets a connection to deliver the content.

4. The transmission system as claimed in claim 3, wherein the path control unit determines the minimum load state delivery path by using load states weighted for the respective individual link load states and the load states of the plurality of delivery servers, respectively.

5. A transmission system including a network having a plurality of delivery servers for delivering a content responding to a delivery request from a client device for receiving the content, the transmission system comprising:
   a database that stores server load states of the plurality of delivery servers, and respective individual link load states for a plurality of delivery paths defined between a plurality of delivery server side routers and a client side router;
   a first collecting unit capable of collecting the server load states of the plurality of delivery servers and updating the database;
   a second collecting unit capable of collecting the respective individual link load states and updating the database;
   a path control unit that determines a minimum load state delivery path having a minimum load state among the plurality of delivery paths, based on sums of the server load states and the respective individual link load states stored in the database updated by the first collecting unit and the second collecting unit, the path control unit using a virtual node connected to the plurality of delivery server side routers via virtual links; and
   a router control unit, which sets a connection to deliver the content, included in each of a plurality of routers provided in the minimum load state delivery path determined by the path control unit, wherein the path control unit replaces the server load states of the plurality of delivery servers with individual link load states in directions from the virtual node via the virtual links, respectively, to the client side router, and determines a set of a delivery server and a delivery path by using the individual link load states.

6. A delivery path controller in a transmission system having: a plurality of delivery server side routers which communicate with a plurality of delivery servers for delivering a content; and a client side router which communicates with a client device for receiving the content, the delivery path controller comprising:
   a database that stores server load states of the plurality of delivery servers, and respective individual link load states for a plurality of delivery paths defined between the plurality of delivery server side routers and the client side router;
   a path control unit that determines a minimum load state delivery path having a minimum load state among the plurality of delivery paths, based on sums of the server load states and the respective individual link load states stored in the database, the path control unit using a virtual node connected to the plurality of delivery server side routers via virtual links; and
   a router control unit, which sets a connection to deliver the content, included in each of a plurality of routers provided in the minimum load state delivery path determined by the path control unit, wherein the path control unit replaces the server load states of the plurality of delivery servers with individual link load states in directions from the virtual node via the virtual links, respectively, to the client side router, and determines a set of a delivery server and a delivery path by using the individual link load states.

7. The delivery path controller as claimed in claim 6, wherein
   for an individual link load state between adjacent routers among a plurality of routers through which a packet is transferred, the database stores bidirectional individual link load states in a first direction from one router to another router and in a second direction from the another router to the one router, and
   by using at least either of the bidirectional individual link load states, the path control unit determines a set of a delivery server and a delivery path having such a load state that a sum of the individual link load state and a server load state is minimum, as the minimum load state delivery path.

8. The delivery path controller as claimed in claim 6, wherein
   the path control unit determines the set of a delivery server and a delivery path by using individual link load states in directions from the plurality of delivery server side routers to the client side router or in directions from the client side router to the plurality of delivery server side routers for the plurality of delivery paths, respectively.

9. The delivery path controller as claimed in claim 6, wherein
   as a responding path from a delivery server, which has received a transfer request from the client side router, to the client side router, the path control unit determines a set of a delivery server, which is a delivery request transferring destination, and a delivery path, by using individual link load states in directions from the client side router to the plurality of delivery server side routers.

10. The delivery path controller as claimed in claim 6, wherein
    as a responding path from a delivery server, which has received a transfer request from the client side router, to the client side router, the path control unit determines a set of a delivery server, which is a delivery request transferring destination, and a delivery path, by using individual link load states in directions from a virtual node accessing to the plurality of delivery servers via virtual links, respectively, to the client side router, as well as the individual link load states in directions from the client side router to the plurality of delivery server routers.

11. A load information collecting device in a transmission system having: a plurality of delivery server side routers which communicate with a plurality of delivery servers for delivering a content; and a client side router which communicates with a client device for receiving the content, the load information collecting device comprising:
    a database that stores server load states of the plurality of delivery servers, and respective individual link load states for a plurality of delivery paths defined between the plurality of delivery server side routers and the client side router; and
    a path control unit that writes, into the database, the server load states collected from the plurality of delivery servers and individual link load states between adjacent routers collected from the adjacent routers among a plurality of routers, and the path control unit using a virtual node connected to the plurality of delivery server side routers via virtual links, wherein the path control unit replaces the server load states of the plurality of delivery servers with individual link load states in directions from the virtual node via the virtual links, respectively, to the client side router, and determines a set of a delivery server and a delivery path by using the individual link load states in directions from the virtual node via the virtual links, respectively, to the client side router.

12. A method for determining a delivery path in a transmission system having: a plurality of delivery server side routers which communicate with a plurality of delivery servers for delivering a content; and a client side router which communicates with a client device for receiving the content, the method for determining a delivery path comprising:

collecting server load states of the plurality of delivery servers;

collecting individual link load states between adjacent routers collected from the adjacent routers among a plurality of routers;

calculating sums of the server load states and the individual link load states collected, by using a Dijkstra method;

based on the sums, determining a minimum load state delivery path having a minimum load state among a plurality of delivery paths;

setting a connection for delivering the content in each of a plurality of routers provided in the minimum load state delivery path determined; and replacing the server load states of the plurality of delivery servers with individual link load states in directions from a virtual node connected to the plurality of delivery server side routers via virtual links, respectively, to the client side router, and determining a set of a delivery server and a delivery path by using the individual link load states.

* * * * *